US012098927B2

(12) United States Patent
Umeda

(10) Patent No.: US 12,098,927 B2
(45) Date of Patent: Sep. 24, 2024

(54) NAVIGATION SYSTEM AND SERVER APPARATUS

(71) Applicant: SUBARU CORPORATION, Tokyo (JP)

(72) Inventor: Kazuki Umeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 267 days.

(21) Appl. No.: 17/703,737

(22) Filed: Mar. 24, 2022

(65) Prior Publication Data

US 2022/0316896 A1 Oct. 6, 2022

Related U.S. Application Data

(63) Continuation of application No. PCT/JP2021/013914, filed on Mar. 31, 2021.

(51) Int. Cl.
| | | |
|---|---|---|
| *G01C 21/34* | (2006.01) | |
| *B60W 40/06* | (2012.01) | |
| *B60W 40/10* | (2012.01) | |
| *G01C 21/36* | (2006.01) | |
| *G08G 1/01* | (2006.01) | |
| *G08G 1/048* | (2006.01) | |

(52) U.S. Cl.
CPC ......... *G01C 21/3461* (2013.01); *B60W 40/06* (2013.01); *B60W 40/10* (2013.01); *G01C 21/3676* (2013.01); *G01C 21/3691* (2013.01); *G08G 1/0112* (2013.01); *G08G 1/0133* (2013.01); *G08G 1/048* (2013.01); *B60W 2555/20* (2020.02); *B60W 2556/65* (2020.02)

(58) Field of Classification Search
CPC .... G08G 1/048; G08G 1/0112; G08G 1/0133; G01C 21/3676; G01C 21/3461; B60W 40/10; B60W 40/06
USPC .......................................................... 701/414
See application file for complete search history.

(56) References Cited

U.S. PATENT DOCUMENTS

| 10,699,347 B1 * | 6/2020 | Slusar ................ G01C 21/3461 |
| 2016/0272243 A1 * | 9/2016 | Matsuno .............. G05D 1/0231 |

(Continued)

FOREIGN PATENT DOCUMENTS

| JP | 2000-346959 A | 12/2000 |
| JP | 2005-084959 A | 3/2005 |

(Continued)

*Primary Examiner* — Yazan A Soofi
(74) *Attorney, Agent, or Firm* — Rimon P.C.

(57) ABSTRACT

A navigation system includes a server apparatus connected to vehicles via a network and a navigation apparatus connected to the server apparatus via the network. The server apparatus receives, from a first vehicle, traffic-related information related to snow on a road on which the first vehicle has traveled or slipperiness of the road, and location information of the road; generates difficulty information for the road related to a travel difficulty caused by the snow or the slipperiness; and transmits the difficulty information and the location information to the navigation apparatus movable together with a second vehicle identical to or different from the first vehicle. The navigation apparatus receives the difficulty information and the location information; sets a traffic regulation for passage of the second vehicle through the road; and sets, for the second vehicle, a travel route based on the traffic regulation.

14 Claims, 7 Drawing Sheets

(56) References Cited

U.S. PATENT DOCUMENTS

| | | | |
|---|---|---|---|
| 2019/0294167 A1* | 9/2019 | Kutila | G08G 1/091 |
| 2020/0166360 A1* | 5/2020 | Jaganathan | G08G 1/0141 |
| 2020/0198643 A1 | 6/2020 | Kusama et al. | |
| 2020/0361495 A1* | 11/2020 | Namba | G01C 21/3617 |
| 2022/0281456 A1* | 9/2022 | Giovanardi | G01S 17/931 |
| 2022/0397402 A1* | 12/2022 | Bolless | G08G 1/096725 |
| 2023/0127230 A1* | 4/2023 | Molnar | B60W 40/10 |
| | | | 701/23 |

FOREIGN PATENT DOCUMENTS

| | | |
|---|---|---|
| JP | 2009-123153 A | 6/2009 |
| JP | 2014-010461 A | 1/2014 |
| JP | 2014-184747 A | 10/2014 |
| JP | 2016-172500 A | 9/2016 |
| JP | 2020-101924 A | 7/2020 |
| JP | 2020-187593 A | 11/2020 |

\* cited by examiner

FIG. 5
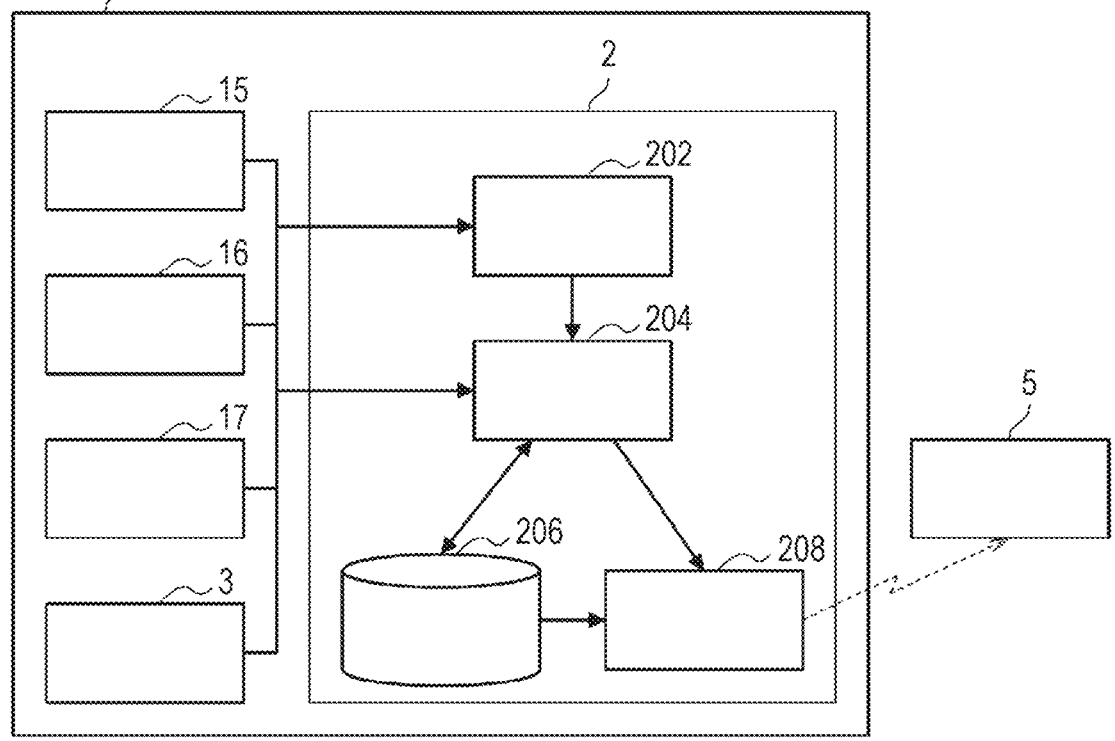
FIG. 6
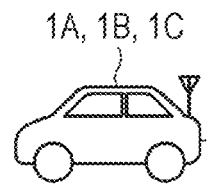
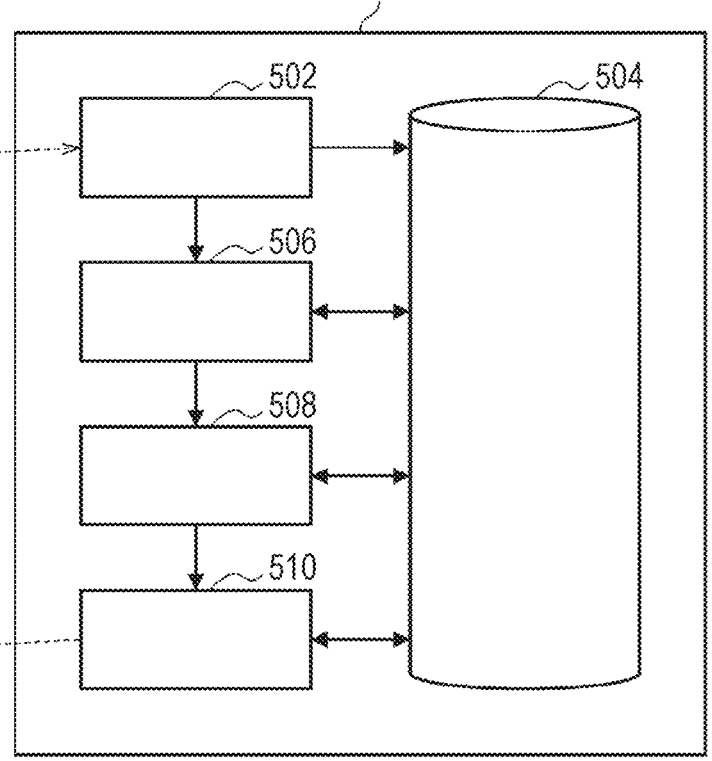

FIG. 7

| ROAD SURFACE STATE | DIFFICULTY CLASS |
|---|---|
| SNOW ACCUMULATION: NO | 0 |
| SNOW ACCUMULATION: YES, RUTS: YES | 1 |
| SNOW ACCUMULATION: YES, RUTS: NO | 2 |

FIG. 8

| ROAD WIDTH | DIFFICULTY CLASS |
|---|---|
| HINDRANCE TO PASSAGE: NO | 1 |
| HINDRANCE TO PASSAGE: YES | 3 |

FIG. 9

| TIRE TYPE | DRIVE SYSTEM | DIFFICULTY CLASS |
|---|---|---|
| NORMAL TIRE | FR | 1 |
| NORMAL TIRE | FF | 1 |
| NORMAL TIRE | 4WD | 2 |
| WINTER TIRE | FR | 2 |
| WINTER TIRE | FF | 2 |
| WINTER TIRE | 4WD | 4 |

FIG. 10

| SLIP: YES | | DIFFICULTY CLASS | | | | | |
|---|---|---|---|---|---|---|---|
| TIRE TYPE | | NORMAL TIRE | | | WINTER TIRE | | |
| DRIVE SYSTEM | | FR | FF | 4WD | FR | FF | 4WD |
| ROAD SURFACE STATE | SNOW ACCUMULATION: NO | 0 | 0 | 0 | 0 | 0 | 0 |
| ROAD SURFACE STATE | SNOW ACCUMULATION: YES, RUTS: YES | 1 | 1 | 2 | 2 | 2 | 4 |
| ROAD SURFACE STATE | SNOW ACCUMULATION: YES, RUTS: NO | 2 | 2 | 3 | 3 | 3 | 5 |

NAVIGATION SYSTEM AND SERVER APPARATUS

CROSS REFERENCE TO RELATED APPLICATIONS

This application is continuation of International Application No. PCT/JP2021/013914, filed on Mar. 31, 2021, the entire contents of which are hereby incorporated by reference.

TECHNICAL FIELD

The invention relates to a navigation system for guiding a vehicle on a travel route, a server apparatus, a navigation apparatus, and a vehicle.

BACKGROUND ART

In an area with a lot of snow, accumulation of snow on a road may block a traffic network or cause a traffic jam. Against such snow accumulation, measures are taken such as removing snow on a road using a snowplow or providing information on a traffic jam caused by snow accumulation by installing observation equipment everywhere in the road network and observing and grasping a snow accumulation state of the road.

For example, PTL 1 describes a road state observation system that detects a snow accumulation state of a road using a snow accumulation sensor at a plurality of observation sites in a road network. In this road state observation system described in PTL 1, an information processing terminal at a civil engineering office collects a snow accumulation state detected at each of the observation sites and grasps an amount of snow accumulation in a width direction of the road in real time. The information processing terminal then creates a three-dimensional diagram representing a distribution of the amount of snow accumulation and displays the three-dimensional diagram on a user interface screen.

CITATION LIST

Patent Literature

PTL 1: Japanese Unexamined Patent Application Publication No. 2000-346959

SUMMARY OF INVENTION

A navigation system according to an embodiment of the invention is the navigation system including a server apparatus to be connected to vehicles via a network to be able to communicate with the vehicles, and a navigation apparatus to be connected to the server apparatus via the network to be able to communicate with the server apparatus, in which the server apparatus is configured to receive, from at least one first vehicle among the vehicles, traffic-related information related to at least one of snow present on a road on which the first vehicle has traveled or slipperiness of the road, and location information of the road, generate, based on the traffic-related information and the location information, difficulty information for the road on which the first vehicle has traveled, the difficulty information being information related to a travel difficulty caused by the at least one of the snow present on the road or the slipperiness of the road, and transmit the difficulty information and the location information of the road on which the first vehicle has traveled, to the navigation apparatus installed to be movable together with a second vehicle among the plurality of vehicles, the second vehicle being identical to or different from the first vehicle, and the navigation apparatus is configured to receive the difficulty information and the location information from the server apparatus, set a traffic regulation for passage of the second vehicle through the road, based on the difficulty information and the location information, and set a travel route of the second vehicle to a destination of the second vehicle, based on the traffic regulation, and the difficulty information comprises a difficulty class, into which the travel difficulty of the road on which the first vehicle has traveled is classified, the travel difficulty being caused by the snow present on the road, the traffic-related information comprises road image information obtained by imaging the road on which the first vehicle has traveled, and the server apparatus is configured to detect, based on the road image information, a first road width that is a passable road width in a state where the snow is present on the road, and determine the difficulty class of the road on which the first vehicle has traveled, based on a result of comparison between the first road width and a second road width that is a road width in a state where the snow is not present on the road.

In addition, a server apparatus according to an embodiment of the invention is the server apparatus connected to a plurality of vehicles via a network to be able to communicate with the plurality of vehicles, including one or more processors, and one or more memories coupled to the one or more processors, in which the one or more processors are configured to perform a process including receiving, from at least one first vehicle among the vehicles, traffic-related information related to at least one of snow present on a road on which the first vehicle has traveled or slipperiness of the road, and location information of the road;

generating, based on the traffic-related information and the location information, difficulty information for the road on which the first vehicle has traveled, the difficulty information being information related to a travel difficulty caused by the at least one of the snow present on the road or the slipperiness of the road; and transmitting the difficulty information and the location information of the road on which the first vehicle has traveled, to a navigation apparatus installed to be movable together with a second vehicle among the vehicles, the second vehicle being identical to or different from the first vehicle among the plurality of vehicles, the difficulty information comprises a difficulty class, into which the travel difficulty of the road on which the first vehicle has traveled is classified, the travel difficulty being caused by the snow present on the road, the traffic-related information comprises road image information obtained by imaging the road on which the first vehicle has traveled, and the processors are configured to detect, based on the road image information, a first road width that is a passable road width in a state where the snow is present on the road, and determine the difficulty class of the road on which the first vehicle has traveled, based on a result of comparison between first road width and a second road width that is a road width in a state where the snow is not present on the road.

BRIEF DESCRIPTION OF DRAWINGS

FIG. 5 is a block diagram illustrating an example of a functional configuration of a vehicle on transmission side according to the embodiment.

FIG. 6 is a block diagram illustrating an example of a functional configuration of the server apparatus according to the embodiment.

FIG. 7 is an explanatory diagram illustrating a specific example of a class determination table for use in a difficulty class determination process according to the embodiment.

FIG. 8 is an explanatory diagram illustrating another specific example of the class determination table for use in the difficulty class determination process according to the embodiment.

FIG. 9 is an explanatory diagram illustrating another specific example of the class determination table for use in the difficulty class determination process according to the embodiment.

FIG. 10 is an explanatory diagram illustrating another specific example of the class determination table for use in the difficulty class determination process according to the embodiment.

DESCRIPTION OF EMBODIMENTS

A travel difficulty of a road caused by snow accumulation changes from moment to moment depending on the amount of snow accumulation on the road, the road surface state, the state of snow removal, etc. For example, there is a case where even if a road normally allows two-lane traffic, the road width narrows because of removed snow at the time of snow accumulation and consequently the road allows substantially just one-lane traffic. In addition, there is a case where the road surface freezes to become slippery, or a case where ruts formed on a snowy road become deep and thus causes a vehicle to get stuck.

Further, driving performance of a vehicle on a snowy road varies depending on the type of tires mounted on the vehicle (for example, normal tires or winter tires such as studless tires), the wheel drive system (for example, two-wheel drive or four-wheel drive), or the like. The travel difficulty of a snowy road also changes depending on such driving performance.

As described above, the travel difficulty of a snowy road changes depending on not only the snow accumulation state (such as the amount of snow accumulation, the road surface state, or the road width) of the road but also the driving performance of the vehicle on the snowy road. Therefore, a navigation system is desirably capable of proposing an appropriate travel route to a destination in consideration of not only a distance to the destination and a traffic jam state but also a travel difficulty based on an actual snow accumulation state of the road.

Accordingly, an object of embodiments of the invention is to guide a vehicle on an appropriate travel route in accordance with an actual travel difficulty of a road in a navigation system.

According to the embodiments of the invention, a navigation system can guide a vehicle on an appropriate travel route in accordance with an actual travel difficulty of a road.

Embodiments of the invention will be described in detail below with reference to the accompanying drawings. Specific dimensions, materials, numerical values, and the like presented in such an embodiment are merely examples for facilitating understanding of the invention, and do not limit the invention unless otherwise specified. In this description and the drawings, elements having substantially the same functions and configurations are denoted by the same reference signs, so that redundant description thereof is omitted. In addition, illustrations of elements not directly related to the invention are omitted.

[1. Overall Configuration of Navigation System]

Figure 1:
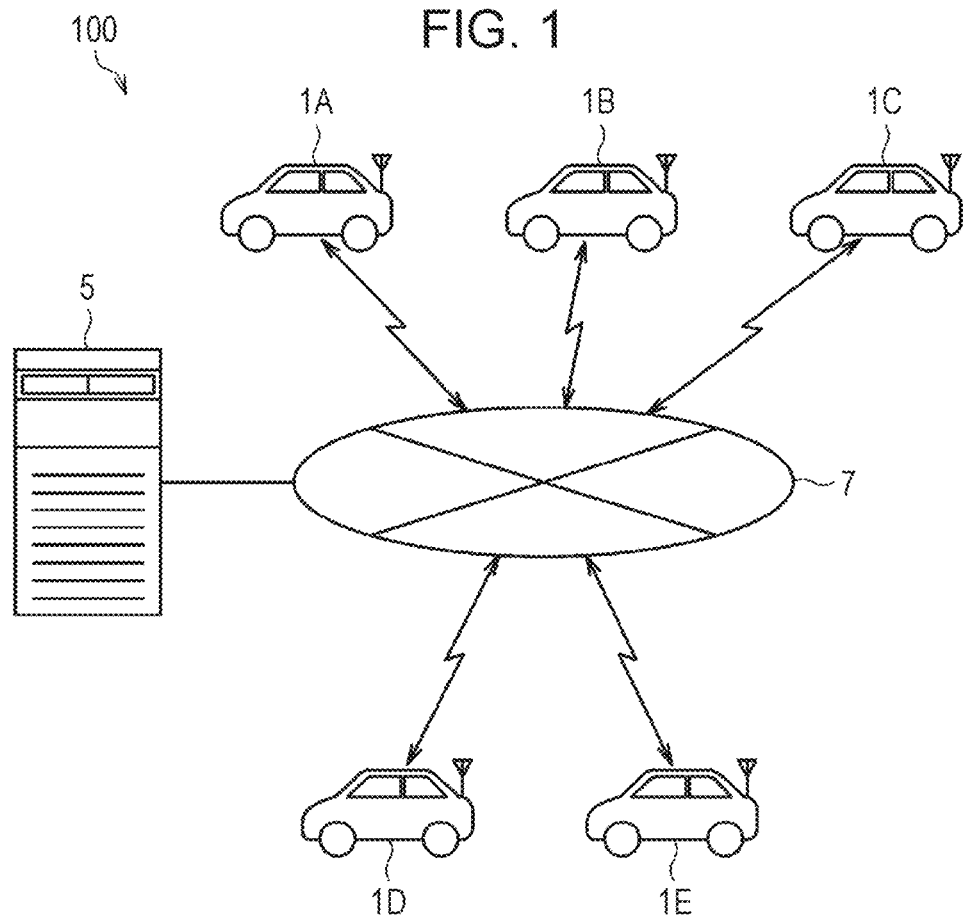
FIG. 1 is a schematic diagram illustrating a navigation system according to an embodiment of the invention.

First, an overall configuration of a navigation system 100 according to an embodiment of the invention will be described with reference to FIG. 1. FIG. 1 is a schematic diagram illustrating the navigation system 100 according to the embodiment.

As illustrated in FIG. 1, the navigation system 100 according to the embodiment includes a plurality of vehicles 1A to 1E (hereinafter, may be collectively referred to as "vehicles 1") and at least one server apparatus 5. The vehicles 1 and the server apparatus 5 are connected to each other via a network 7 to be able to communicate with each other.

The vehicles 1 are automobiles capable of traveling on a road. One or more of the vehicles 1 are, for example, engine vehicles each equipped with an engine as a driving source for traveling. One or more of the vehicles 1 may be hybrid vehicles each equipped with an engine and a motor as driving sources for traveling, or may be electric vehicles each equipped with a motor as a driving source for traveling. In the embodiment, an example will be mainly described in which the vehicles 1 are four-wheeled private automobiles. However, the embodiment is not limited to such an example, and One or more of the vehicles 1 may be various automobiles such as commercial vehicles such as buses, trucks, or taxis; special vehicles such as police cars, fire engines, ambulances, wreckers, snowplows, or construction vehicles; or motorcycles.

The server apparatus 5 is a program-installed digital computer and has a server function. The server apparatus 5 is constituted by, for example, a computer apparatus of various kinds such as a server computer, a personal computer, a workstation, a mainframe computer, or a microcomputer.

The network 7 is a wireless or wired communication line network that connects the vehicles 1 and the server apparatus 5 to each other so that they can communicate with each other. The network 7 is constituted by various networks such as, for example, a satellite communication network for GPS (Global Positioning System) or the like, a mobile phone network, the Internet, a LAN (Local Area Network), a WAN (Wide Area Network), and other dedicated line networks. At least part of the network 7 includes a wireless network to connect the vehicles 1 to an external apparatus to be able to perform wireless communication. The network 7 may include a wised network as part thereof.

The vehicles 1 communicate with the server apparatus 5 via the network 7. Thus, the vehicles 1 each include a communication device capable of connecting to and communicating with an external apparatus via the network 7 in a wireless or wired manner. Likewise, the server apparatus 5 communicates with the vehicles 1 via the network 7. Thus, the server apparatus 5 includes a communication device capable of connecting to and communicating with an external apparatus via the network 7 in a wireless or wired manner. The vehicles 1 and the server apparatus 5 communicate with each other via the network 7, so that various kinds of information can be shared among the plurality of vehicles 1 and the server apparatus 5 and various functions and services can be provided from the server apparatus 5 to all or some of the vehicles 1.

In this way, the vehicles 1 and the server apparatus 5 constitute a so-called client-server system. The vehicles 1 (clients) each of which a user is on board and is operated by the user transmits various kinds of information such as information input by the user, information on each of the vehicles 1, and information on a surrounding environment of each of the vehicles 1, to the server apparatus 5 (server). The server apparatus 5 (server) collects, accumulates, and processes information transmitted from the plurality of vehicles 1 (clients), and distributes various functions and information to each of the vehicles 1 (clients) based on the information.

Each of the vehicles 1 is equipped with a navigation apparatus (not illustrated in FIG. 1) for guiding each of the vehicles 1 on a travel route. The navigation apparatus is installed to be movable together with each of the vehicles 1. For example, the navigation apparatus may be installed in each of the vehicles 1 in a fixed manner. In this case, the navigation apparatus may be connected to the server apparatus 5 via the communication device mounted on each of the vehicles 1 to be able to communicate with the server apparatus 5. Alternatively, the navigation apparatus may be a terminal device having a communication function such as, for example, a smartphone, a personal computer (PC), or a tablet PC, that can be brought into each of the vehicles 1. In this case, the navigation apparatus may be connected t the server apparatus 5 via the network 7 to be able to communicate with the server apparatus 5 by using its own communication function without using the communication device mounted on each of the vehicles 1.

[2. Overview of Navigation System]

An overview of a navigation function provided by the navigation system 100 according to the embodiment will now be described with reference to FIG. 1. Each of the vehicles 1 is equipped with the navigation apparatus (not illustrated in FIG. 1) for guiding each of the vehicles 1 (vehicles of interest) on a travel route.

The navigation system 100 according to the embodiment is characterized by guiding each of the vehicles 1 on an appropriate travel route in accordance with, for example, a state of snow present on a road on which each of the vehicles 1 travels, a state of slipperiness of the road, driving performance of each of the vehicles 1 on a snowy road, and the like. Herein, a snowy road means a road on which snow is present. Examples of the snowy road include roads on which snow in various states is present, such as a road on which snow is accumulated, a road on which new snow is present, a road on which snow compacted by traveling of the vehicles 1 is present, a road on which melted snow has frozen, and a road on which a snow lump or the like moved by snow removal or the like is present.

Thus, each of the vehicles 1 (first vehicles) acquires traffic-related information related to at least one of snow present on a road on which the vehicle has traveled or slipperiness of the road. The traffic-related information includes, for example, road image information obtained by imaging the road on which the vehicle has traveled, slip information indicating the presence or absence of a slip, and information related to driving performance of the vehicle on a snowy road. Each of the vehicles 1 transmits, to the server apparatus 5, the traffic-related information related to snow present on a road on which each of the vehicles has traveled, slipperiness of the road, or the like, and location information of the road in association with each other.

The server apparatus 5 collects and accumulates the plurality of pieces of traffic-related information and the plurality of pieces of location information of the roads received from the plurality of vehicles 1, and analyzes the snow accumulation state (for example, a road surface state, a road width, and an amount of snow accumulation) at each location in the road network. Then, the server apparatus 5 determines, for each location in the road network, difficulty information indicating a travel difficulty caused by at least one of the snow present on the road or the slipperiness of the road. The difficulty information includes, for example, a difficulty class into which the travel difficulty of the snowy road is classified and information related to the road width of the snowy road. The difficulty class is a generic difficulty class shared by the plurality of vehicles 1. Then, the server apparatus 5 distributes, to each of the vehicles 1 (second vehicles), the location information and the difficulty information including the difficulty class of each location in the road network in association with each other.

As a result, the navigation apparatus mounted on each of the vehicles 1 (second vehicles) sets a traffic regulation unique to the vehicle for the road network around the vehicle, based on the difficulty information including the generic difficulty class received from the server apparatus 5 and the driving performance of the vehicle on a snowy road. Then, the navigation apparatus sets an appropriate travel route that matches the snow accumulation state of the road and the driving performance of the vehicle, based on the traffic regulation unique to the vehicle, and guides the vehicle on the travel route to the destination.

As described above, in the navigation system 100 according to the embodiment, each of the vehicles 1 transmits the traffic-related information and the location information of the road on which each of the vehicles 1 is traveling, to the server apparatus 5 in real time. Then, the server apparatus 5 distributes the difficulty information, including the difficulty class, the road width, or the like for each location in the road network, and the location information of the location to each of the vehicles 1 in real time. In FIG. 1, the vehicles 1A, 1B, and 1C correspond to an example of vehicles (first vehicles) that transmit the traffic-related information, the location information, and the like to the server apparatus 5. On the other hand, the vehicles 1D and 1E, correspond to an example of vehicles (second vehicles) that receive the difficulty information, the location information, and the like from the server apparatus 5. Hereinafter, for convenience of description, the vehicles 1A, 1B, and 1C may be referred to as "vehicles 1 on transmission side", "each of the vehicles 1 on transmission side", or the like, and the vehicles 1D and 1E may be referred to as "vehicles 1 on reception side", "each of the vehicles 1 on reception side", or the like.

Note that, similarly to the vehicles 1 which are on reception side (second vehicles), the vehicles 1 which are on transmission side (first vehicles) may also have a function of receiving the difficulty information, the location information, and the like from the server apparatus 5, setting a traffic regulation according to the difficulty class and the driving performance thereof, and setting an appropriate traveling route in accordance with the traffic regulation. In addition, similarly to the vehicles 1 on transmission side (first vehicles), the vehicles 1 on reception side (second vehicles) may also have a function of transmitting the traffic-related information, the location information, and the like of a road on which the vehicles have traveled to the server apparatus 5. That is, the plurality of vehicles 1A to 1E may have both the function of the vehicles 1 on transmission side and the function of the vehicles 1 on reception side. Alternatively, just some vehicles of the plurality of vehicles 1A to 1E may have the function of the vehicles 1 on transmission side or the function of the vehicles 1 on reception side.

[3. Hardware Configuration of Vehicle]

Figure 2:
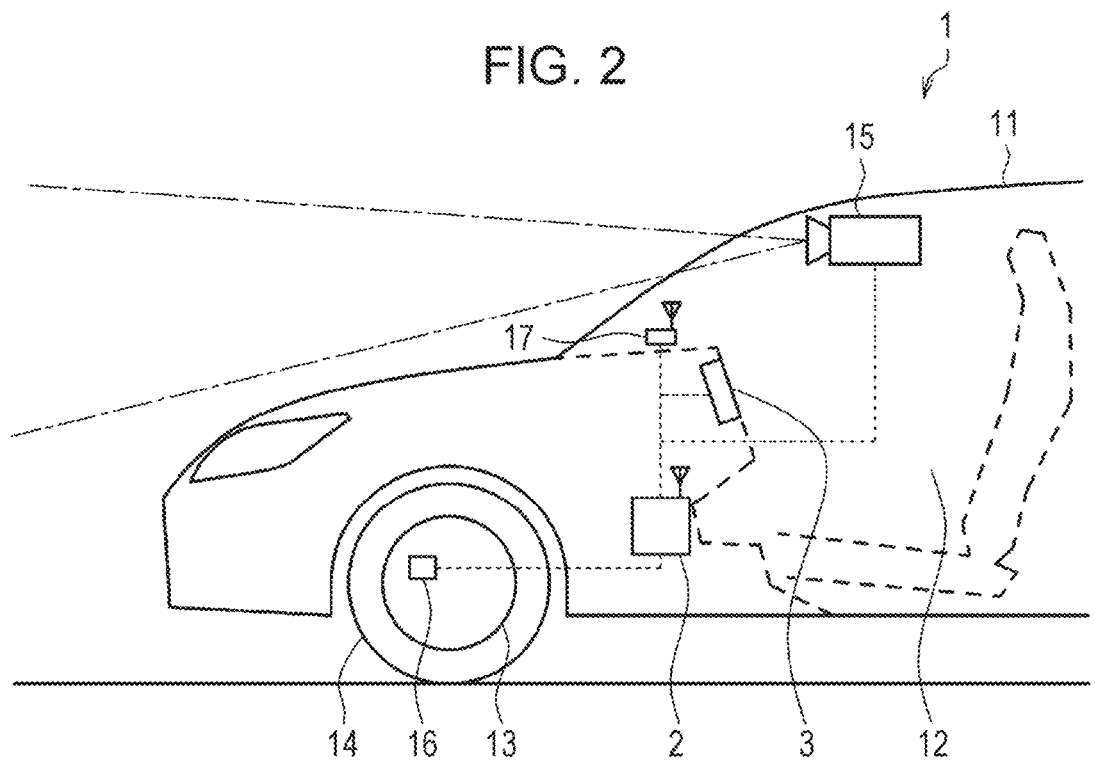
FIG. 2 is a schematic diagram illustrating an example of a hardware configuration of a vehicle according to the embodiment.

Next, a hardware configuration of each of the vehicles 1 according to the embodiment will be described with reference to FIG. 2. FIG. 2 is a schematic diagram illustrating an example of the hardware configuration of each of the vehicles 1 according to the embodiment.

As illustrated in FIG. 2, each of the vehicles 1 includes a vehicle body 11, a vehicle cabin 12, wheels 13, tares 14, a camera 15, wheel speed sensors 16, a GPS (Global Positioning System) module 17, an ECU (Electronic Control Unit) 2, and a navigation apparatus 3. Among them, the camera 15, the wheel speed sensors 16, the GPS module 17, the ECU 2, and the navigation apparatus 3 are connected to one another in, for example, a wired or wireless manner to be able to communicate with one another.

The camera 15 is an example of an imaging apparatus that captures an image of a road around each of the vehicles 1. The camera 15 is installed in a front upper portion of the vehicle cabin 12 which a driver is to be on board, and images a road in front of each of the vehicles 1 while each of the vehicles 1 is traveling or is stationary. Note that the camera 15 may be, for example, a camera used in a drive recorder, a driving support system, or the like, or may be a dedicated camera for the navigation system 100 according to the embodiment. In addition, the camera 15 may capture a moving image and/or a still image but is preferably capable of capturing a moving image. Note that the camera 15 may capture, for example, an image of a road in any direction of front, rear, and sides of each of the vehicles 1. However, the camera 15 preferably captures an image of the road in front of each of the vehicles 1 in order to grasp the snow accumulation state of the road with a wide field of view. Data of the road image captured by the camera 15 is output to, for example, the ECU 2, and is recorded on a recording medium as needed.

The wheel speed sensors 16 are an example of a slip detection device that detects a slip of each of the wheels 13 on a snowy or frozen road or the like. Each of the wheel speed sensors 16 is attached to each of the wheels 13 and detects a rotational speed of each of the wheels 13. It is possible to detect the presence or absence of a slip of each of the wheels 13, the degree of the slip, and the like from the rotation speeds of the wheels 13, the traveling speed of each of the vehicles 1, and the like. The wheel speed sensors 16 are installed on the front wheels, the rear wheels, or both of the front wheels and the rear wheels. To properly detect a slip, the wheel speed sensors 16 are preferably installed on at least two driving wheels among the wheels 13 of each of the vehicles 1, and the wheel speed sensors 16 are more preferably installed on all the wheels 13 of each of the vehicles 1, for example, the two front wheels and the two rear wheels. The rotation speeds of the wheels 13 detected by the respective wheel speed sensors 16 are output to, for example, the ECU 2 and are recorded in a memory as needed.

The GPS module 17 is an example of a location detection device that detects the location of each of the vehicles 1. By detecting the location of each of the vehicles 1 using the GPS module 17, it is possible to detect the location of the road imaged by the camera 15, the location of the road on which a slip detected by the wheel speed sensors 16 has occurred, and the like. The location information indicating the location of each of the vehicles 1 detected by the GPS module 17, i.e., the location of the road, is output to, for example, the ECU 2 and is recorded in the memory as needed. The location information includes, for example, latitude and longitude information.

The ECU 2 is an example of a control device that controls various devices mounted in each of the vehicles 1. The ECU 2 is constituted by a microcontroller that electronically controls the various devices mounted in each of the vehicles 1. In the embodiment, the ECU 2 is an example of an information collection device that collects the traffic-related information detected while each of the vehicles 1 is traveling on a snowy road. The ECU 2 collects the traffic-related information, based on information detected by various detection devices (for example, the camera 15 and the wheel speed sensors 16 described above) mounted in each of the vehicles 1.

The ECU 2 has a function of communicating with the devices, for example, a control device and an onboard electronic device, installed in each of the vehicles 1. The ECU 2 transmits and receives various kinds of information to and from the devices. For example, CAN (Controller Area Network) communication may be used as a scheme of communication between the ECU 2 and the devices. The ECU 2 also functions as a communication device that communicates with an external apparatus such as the server apparatus 5. The ECU 2 includes a wireless communication device, and transmits or receives various kinds of information to or from an external apparatus such as the server apparatus 5. For example, the ECU 2 transmits the traffic-related information and the location information collected in the corresponding vehicle to the server apparatus 5.

The navigation apparatus 3 is an example of a navigation apparatus that guides each of the vehicles 1 on a travel route. The navigation apparatus 3 is installed, for example, at a front panel located in a front portion of the vehicle cabin 12. The navigation apparatus 3 functions as a display device that displays various images such as a map image for use in guidance of a travel route. In addition, the navigation apparatus 3 includes, for example, a touch panel, input keys, or the like, and functions as an input device that receives an input operation performed by the driver. For example, by using the input function of the navigation apparatus 3, the driver can input, as the traffic-related information, tire information related to the type of the tires 14 mounted on the wheels 13 of each of the vehicles 1, for example. The traffic-related information such as the tire information input by the driver is output to, for example, the ECU 2 and is recorded on a recording medium as needed.

As illustrated in FIG. 2, the navigation apparatus 3 according to the embodiment is mounted at the front panel of each of the vehicles 1 in a fixed manner and is not for the portable use. However, the configuration is not limited to such an example, and the navigation apparatus 3 may be a terminal device such as a smartphone which is to be brought into each of the vehicles 1 by the driver and on which an application having a navigation function is installed. That is, the navigation apparatus 3 may be any of various other electronic devices if the devices are movable together with each of the vehicles 1 while the guided each of the vehicles 1 is traveling and are capable of presenting the current location and the travel route of each of the vehicles 1 to the driver.

[4. Hardware Configuration of Server Apparatus]

Figure 3:
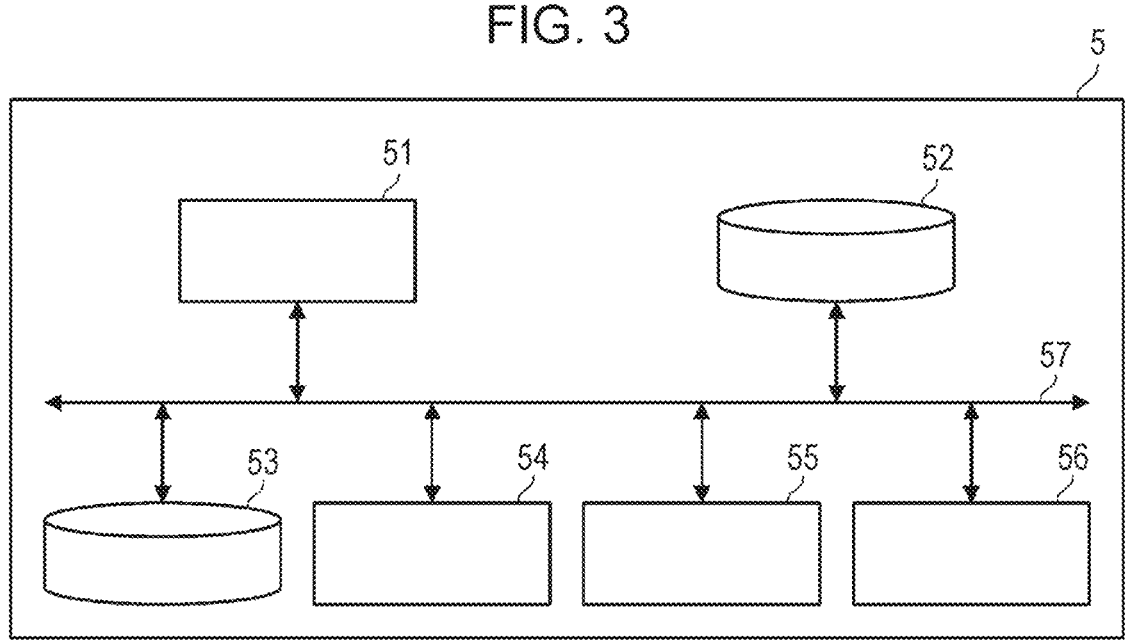
FIG. 3 is a block diagram illustrating an example of a hardware configuration of the server apparatus according to the embodiment.

Next, a hardware configuration of the server apparatus 5 according to the embodiment will be described with reference to FIG. 3. FIG. 3 is a block diagram illustrating an example of the hardware configuration of the server apparatus 5 according to the embodiment.

As illustrated in FIG. 3, the server apparatus 5 includes a processor 51, a memory 52, a storage 53, a communication device 54, an input device 55, an output device 56, and a bus 57.

The processor 51 is an arithmetic processing device mounted on a computer. The processor 51 is constituted by, for example, a CPU (Central Processing Unit) but may be constituted by a microprocessor of another type. Further, the processor 51 may be constituted by one or more processors. The processor 51 performs various processes in the server apparatus 5 by executing a program stored in the memory 52 or another storage medium.

The program is a computer program including instructions to be executed by the computer. Note that the program may be provided to the server apparatus 5 through distribution from an external apparatus via a communication network, for example. The program may also be provided to the server apparatus 5 via a non-transitory computer-readable recording medium (non-transitory computer-readable medium). By installing the program in the server apparatus 5, the server apparatus 5 can implement various functions defined by the program.

The memory 52 is a storage medium that stores a program and other various kinds of data. The memory 52 includes, for example, a RAM (Random Access Memory), a ROM (Read Only Memory), and the like. The ROM is a non-volatile memory that stores a program used by the processor 51, data for use in running the program, and the like. The RAM is a volatile memory that temporarily stores data such as variables, operation parameters, and operation results for use in the processes performed by the processor 51. The program stored in the ROM is read to the RAM and executed by the processor 51 such as a CPU.

The storage 53 is a storage device for storing various kinds of information and data. The storage 53 includes, for example, a recording medium such as a semiconductor memory, a hard disk, or an optical disk; and a drive that reads data from the recording medium or writes data to the recording medium. The storage 53 can store a larger amount of data than the memory 52. The storage 53 may be an internal storage built in the server apparatus 5 or may be an external storage coupled via an external input/output terminal of the server apparatus 5. The storage 53 may also be an online storage connected via a communication network.

The communication device 54 is a device for communicating with an external apparatus connected to the server apparatus 5 in a wired or wireless manner. The communication device 54 establishes a communication connection to an external apparatus in accordance with a predetermined protocol, and transmits and receives various kinds of information and data to and from the external apparatus.

The input device 55 is a device used by a user to input information to the server apparatus 5. The input device 55 includes, for example, a touch sensor, a keyboard, a keypad, a mouse, a remote controller, a button, a switch, or a dial. The input device 55 may include an input device for voice input, such as a microphone or a speech recognition module. The input device 55 may also include a remote control module that receives a user input for remotely operating the server apparatus 5 from a remote device. In response to receiving an input operation performed by a user, the input device 55 sends an input signal corresponding to the input operation to the processor 51.

The output device 56 is a device for outputting information and data to the outside of the server apparatus 5. The output device 56 includes a display device that displays information such as text, graphics, and images, and an audio output device that outputs audio. The display device includes a display having a display screen, and an image display module. The display may be, for example, a liquid crystal display (LCD), a plasma display (PDP), an organic EL display (OLED), or a cathode ray tube (CRT) display. The display device may also be a touch panel in which a display screen is equipped with a touch sensor. The audio output device includes a speaker and an audio output module.

The bus 57 couples the processor 51, the memory 52, the storage 53, the communication device 54, the input device 55, and the output device 56 described above to one another. Thus, various kinds of information and data can be sent and received between these devices.

[5. Hardware Configurations of Navigation Apparatus and ECU]

Figure 4:
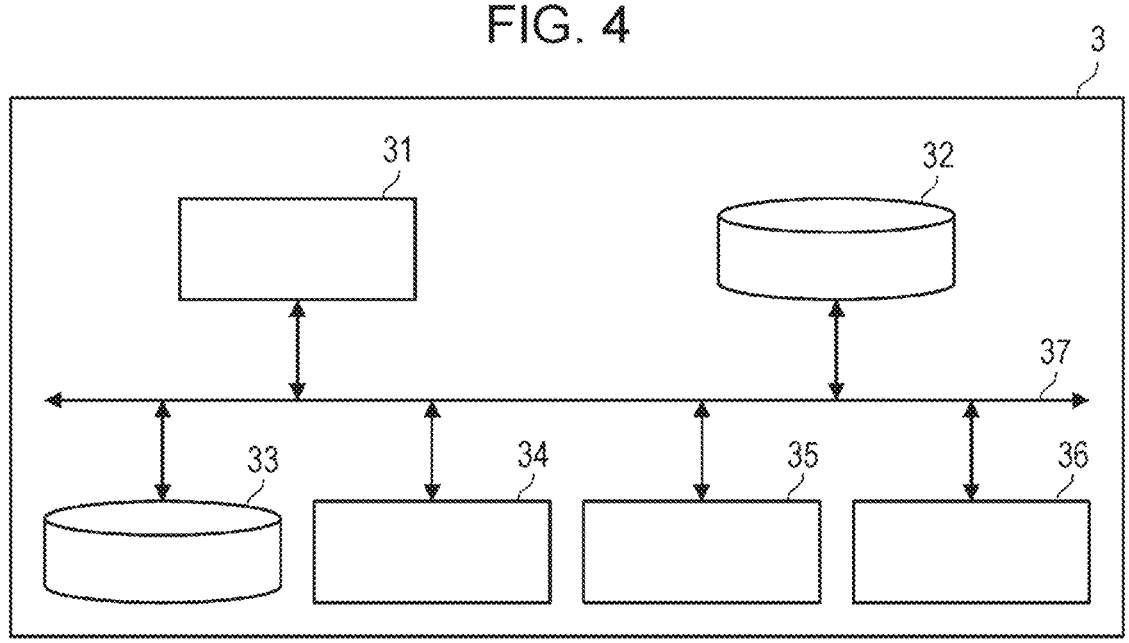
FIG. 4 is a block diagram illustrating an example of a hardware configuration of a navigation apparatus according to the embodiment.

Next, a hardware configuration of the navigation apparatus 3 according to the embodiment will be described with reference to FIG. 4. FIG. 4 is a block diagram illustrating an example of the hardware configuration of the navigation apparatus 3 according to the embodiment.

As illustrated in FIG. 4, the navigation apparatus 3 includes a processor 31, a memory 32, a storage 33, a communication device 34, an input device 35, an output device 36, and a bus 37.

The processor 31, the memory 32, the storage 33, the communication device 34, the input device 35, the output device 36, and the bus 37 of the navigation apparatus 3 (see FIG. 4) have substantially the same configurations and functions as the processor 51, the memory 52, the storage 53, the communication device 54, the input device 55, the output device 56, and the bus 57 of the server apparatus 5 described above (see FIG. 3), respectively. Therefore, detailed description of each device in the hardware configuration of the navigation apparatus 3 is omitted.

Further, the ECU 2 (see FIG. 2) mounted in each of the vehicles 1 described above may have the substantially the same hardware configuration as the server apparatus 5 (see FIG. 3) described above. Therefore, detailed description and illustration of each device in the hardware configuration of the ECU 2 are omitted.

In the embodiment, an example will be described in which the navigation apparatus 3 indirectly communicates with the server apparatus 5 via a communication device (not illustrated) built in the ECU 2. However, the configuration is not limited to such an example, and for example, the navigation apparatus 3 may directly communicate with the server apparatus 5 using the communication device 34 built in the navigation apparatus 3 without using the ECU 2.

In the embodiment, an example will be described in which the driver inputs information to the ECU 2 by using the input device 35 of the navigation apparatus 3 connected to the ECU 2 without providing a dedicated input device in the ECU 2. However, the configuration is not limited to such an example. For example, the ECU 2 may be equipped with a dedicated input device, and the driver may directly input information to the ECU 2. In addition, the navigation apparatus 3 may perform all the processes performed in each of the vehicles 1 in relation to the navigation function according to the embodiment, so that the ECU 2 takes no charge for the processes.

[6. Functional Configuration of Vehicle on Transmission Side]

Next, with reference to FIG. 5, a functional configuration of the vehicles 1A, 1B, and 1C on transmission side (first vehicles) according to the embodiment will be described. FIG. 5 is a block diagram illustrating an example of the functional configuration of each of the vehicles 1 on transmission side according to the embodiment.

As illustrated in FIG. 5, each of the vehicles 1 on transmission side transmits traffic-related information related to snow accumulation or slipperiness of a road on which each of the vehicles 1 has traveled, and location information of the road to the server apparatus 5. The each of the vehicles 1 on transmission side includes a detection unit 202, an information collection unit 204, a storage unit 206, and a transmission unit 208.

The detection unit 202 detects the presence or absence of snow on the road on which each of the vehicles 1 is traveling. For example, the detection unit 202 analyzes data of a road image captured by the camera 15 and determines a luminance distribution of the road image, thereby detecting the presence or absence of snow on the road from the luminance distribution. When white snow with high luminance is included in the road image, the luminance value of the snow portion in the road image is high. In response to detecting snow, the detection unit 202 instructs the information collection unit 204 to acquire the traffic-related information and transmit the traffic-related information to the server apparatus 5.

The information collection unit 204 acquires and collects the traffic-related information related to snow accumulation or slipperiness of the road on which each of the vehicles 1 has traveled from each unit of each of the vehicles 1. The information collection unit 204 also acquires location information of the road from the GPS module 17, for example. Then, the information collection unit 204 stores the collected traffic-related information and the collected location information in the storage unit 206 in association with each other. The storage unit 206 stores the traffic-related information and the location information in association with each other. The transmission unit 208 transmits the traffic-related information and the location information to the server apparatus 5 in association with each other.

While each of the vehicles 1 is traveling, the information collection unit 204 may acquire, in real time, the traffic-related information related to snow accumulation or slipperiness of the road on which each of the vehicles 1 is currently traveling and the location information of the road, and transmit, in real time, the traffic-related information and the location information to the server apparatus 5 via the transmission unit 208. Alternatively, the information collection unit 204 may temporarily store the traffic-related information and the location information in the storage unit 206. Then, the information collection unit 204 may acquire the past traffic-related information and the past location information stored in the storage unit 206, and transmit the past traffic-related information and the past location information to the server apparatus 5 later via the transmission unit 208.

The traffic-related information will now be described. The traffic-related information is various kinds of information related to snow present on the road or slipperiness of the road. The snow present on the road includes, for example, snow accumulated on the road, a snow lump accumulated on the road by snow removal, and the like. The slipperiness of the road is, for example, slipperiness of the road due to freezing of the road surface, snow accumulation, or the like, and corresponds to how likely each of the vehicles 1 traveling on the road slips. The traffic-related information is used for determining a difficulty class indicating a travel difficulty of a snowy road. Details of the difficulty class will be described later.

The traffic-related information includes, for example, (1) road image information, (2) slip information, (3) tire information, and (4) drive system information as described below.

(1) Road Image Information

The road image information is information representing a captured road image of a road on which each of the vehicles 1 has traveled. The road image information is preferably a moving image but may be a still image. If the road on which each of the vehicles 1 has traveled is a snowy road (snow-covered road), the captured road image is an image of the snowy road. Therefore, by analyzing the road image of the snowy road, the snow accumulation state of the snowy road can be detected.

The snow accumulation state is a state of snow present on the road. The snow accumulation state includes, for example, a road surface state, a passable road width, and the like. The road surface state includes, for example, the presence or absence of snow on the road, an amount of snow accumulation, the presence or absence of a rut on the snowy road, a width of the rut, a depth of the rut, and the like. The rut is a track that another of the vehicles 1 has made when traveling on the snowy road. When the snow accumulation state of the snowy road worsens, the travel difficulty of the snowy road increases. Therefore, if the snow accumulation state can be grasped through analysis of road image information obtained by imaging an actual snowy road, the travel difficulty of the snowy road can be determined from the snow accumulation state.

For example, when snow is present on a road, the travel difficulty of the road is higher than that when no snow is present. In addition, when the amount of snow accumulation is large, the travel difficulty of the road is higher than that when the amount of snow accumulation is small. Further, when a rut is formed on a snowy road, the travel difficulty of the road is lower than that when no rut is formed.

In addition, when snow is removed from a snowy road, the removed snow may be build up on both sides of the road as snow walls. In this case, the passable road width for each of the vehicles 1 is narrower than that when there is no snow on the road. For example, a road having two lanes on one side when no snow is present may become a road having one lane on one side or one lane on both sides because of the snow walls when snow is present. When the road width of a snowy road narrows because of snow accumulation and snow removal in this manner, the travel difficulty of the snowy road increases.

(2) Slip Information

The slip information is information indicating the presence or absence, the degree, the number of times, the frequency of slipping of each of the vehicles 1 during traveling on a road. Slipping may include, for example, not only a state in which one or more of the tires 14 slip on a snowy road and each of the vehicles 1 shifts longitudinally or laterally or a state in which one or more of the wheels 13 idle, but also a state in which one or more of the tires 14 get stuck in a recessed portion such as a rut on a snowy road and idles and each of the vehicles 1 gets stuck. As the frequency with which each of the vehicles 1 slips on a snowy road increases, the travel difficulty of the snowy road increases. Therefore, it is possible to determine the travel difficulty of the snowy road from the slip information of each of the vehicles 1 that has actually slipped while traveling on the snowy road.

(3) Tire Information

The tire information is information indicating the type of the tires 14 mounted on each of the vehicles 1. Examples of snow tires (winter tires) suitable for traveling on a snowy road include studless tires, spike tires and chain-attached tires. If the tires 14 mounted on each of the vehicles 1 are is the snow tires, the travel difficulty of a snowy road decreases. On the other hand, if the tires 14 mounted on each of the vehicles 1 are not snow tires, but, for example, are normal tires, the travel difficulty of a snowy road increases. Therefore, it is possible to determine the travel difficulty of the snowy road from the tire information of each of the vehicles 1 that has actually slipped while traveling on the snowy road.

(4) Drive System Information

The drive system information is information indicating a drive system of the plurality of wheels 13 provided in each of the vehicles 1. Examples of the drive system of the wheels 13 include four-wheel drive (4WD) and two-wheel drive (2WD). Further, examples of the two-wheel drive system include front wheel drive (FF) and rear wheel drive (FR). Generally, 4WD is superior to 2WD in driving performance on a snowy road, and FF is superior to FR in driving performance on a snowy road. Therefore, the travel difficulty of the snowy road can be determined from the drive system information of each of the vehicles 1 that has actually slipped while traveling on the snowy road.

The traffic-related information according to the embodiment includes, for example, (1) the road image information, (2) the slip information, (3) the tire information, and (4) the drive system information described above. Thus, it possible to determine the difficulty class with high accuracy, based on many kinds of traffic-related information. However, the traffic-related information may include at least one of these four pieces of information. In addition, the traffic-related information may include other information as described below.

(5) Other Information

Examples of the other traffic-related information acquirable by each of the vehicles 1 include front environment information and distance measurement information detected by an infrared sensor, an ultrasonic sensor, a radar device, or the like mounted in each of the vehicles 1, and information on an outdoor air temperature detected by a temperature sensor, for example. As described above, information detected by various sensors mounted in each of the vehicles 1 may also be collected and transmitted to the server apparatus 5 as the traffic-related information together with the above-described pieces of information (1) to (4).

Specific examples of the traffic-related information have been described above. (1) The road image information can be acquired by the camera 15 described above. Data of a road image captured by the camera 15 is input to the information collection unit 204. The information collection unit 204 collects road image information including the data of the road image as one piece of traffic-related information, and associates it with location information indicating the corresponding location of the road where the road image has been captured.

(2) The slip information can be determined from the wheel rotation speeds of the plurality of wheels 13 detected by the respective wheel speed sensors 16 described above and the traveling speed (vehicle speed) of each of the vehicles 1 detected by a vehicle speed sensor (not illustrated). The wheel rotation speed of each of the wheels 13 and the vehicle speed are input to the information collection unit 204 from the corresponding one of the wheel speed sensors 16 and the vehicle speed sensor, respectively. The information collection unit 204 determines whether each of the vehicles 1 has slipped, based on the wheel rotation speed of each of the wheels 13 and the vehicle speed.

For example, it can be determined that a slip has occurred when the wheel rotation speed of at least one of the wheels 13 is excessively high, when the difference between the wheel rotation speeds of the left and right wheels 13 or of the front and rear wheels 13 is greater than or equal to a threshold, when the difference between the vehicle speed estimated from the wheel rotation speeds and the actual vehicle speed is greater than or equal to a threshold, and so on. When it is determined that a slip has occurred, the information collection unit 204 creates slip information including identification information indicating the occurrence of the slip. Then, the information collection unit 204 collects the slip information as one piece of traffic-related information, and associates the slip information with the location information of the road on which each of the vehicles 1 has traveled at the time of the occurrence of the slip.

In the embodiment, the information collection unit 204 of each of the vehicles 1 creates the slip information from the wheel rotation speeds and the vehicle speed but the configuration is not limited to this example. For example, the server apparatus 5 may generate the slip information. In this case, each of the vehicles 1 may transmit information on the wheel rotation speeds and the vehicle speed to the server apparatus 5 as traffic-related information. The server apparatus 5 may create slip information from the wheel rotation speeds and the vehicle speed included in the traffic-related information.

(3) The tire information can be acquired through an input operation of the driver, for example. Specifically, the driver can input the type of the tires 14 mounted on each of the vehicles 1 to an input device provided in each of the vehicles 1, for example, a touch panel of the navigation apparatus 3.

The tire information input by the driver is input from the navigation apparatus 3 to the information collection unit 204 of the ECU 2. The information collection unit 204 collects the tire information as one piece of traffic-related information.

(4) The drive system information may be automatically acquired from the vehicle information stored in a memory such as the storage unit 206 of the ECU 2, or may be acquired through an input operation of the driver to the navigation apparatus 3, for example. The drive system information is input from the memory or the navigation apparatus 3 to the information collection unit 204. The information collection unit 204 collects the drive system information as one piece of traffic-related information.

The location information of the road can be acquired from a location detection device that detects the location of each of the vehicles 1, for example, from the GPS module 17. When each of the vehicles 1 is traveling on a snowy road, the GPS module 17 always measures the location of the road on which each of the vehicles 1 is traveling. The location information measured by the GPS module 17 is input to the information collection unit 204. The information collection unit 204 associates the location information of the road with the various kinds of traffic-related information described above. Note that the location information may include information on the road width (a non-snowy road width W2 described later) in a state in which no snow is present on the road at the location.

In the manner described above, the information collection unit 204 collects various kinds of traffic-related information from information detected or acquired by each unit of the vehicles 1. The transmission unit 208 transmits the above-described traffic-related information including the road image information, the slip information, the tire information, the drive system information, and the like to the server apparatus 5 in association with the location information of the road corresponding to the traffic-related information.

In the example illustrated in FIG. 5, the ECU 2 of each of the vehicles 1 on transmission side includes the detection unit 202, the information collection unit 204, the storage unit 206, and the transmission unit 208 described above but the configuration is not limited to such an example. The navigation apparatus 3 or another onboard electronic device of each of the vehicles 1 on transmission side may include some or all of the detection unit 202, the information collection unit 204, the storage unit 206, and the transmission unit 208 described above.

[7. Functional Configuration of Server Apparatus]

Next, a functional configuration of the server apparatus 5 according to the embodiment will be described with reference to FIG. 6. FIG. 6 is a block diagram illustrating an example of the functional configuration of the server apparatus 5 according to the embodiment.

As illustrated in FIG. 6, the server apparatus 5 generates difficulty information indicating a travel difficulty at each location of a road, from the traffic-related information and the location information received from the plurality of vehicles 1A, 1B, and 1C on transmission side described above. Then, the server apparatus 5 distributes the difficulty information and the location information of each location of the road to the plurality of vehicles 1D and 1E on reception side. The server apparatus 5 includes a reception unit 502, a storage unit 504, an analysis unit 506, a class determination unit 508, and a transmission unit 510.

The reception unit 502 receives, from each of the vehicles 1, traffic-related information related to snow accumulation on a road on which the vehicle has traveled and location information of the road. The reception unit 502 stores the received traffic-related information and location information in the storage unit 504 in association with each other. The storage unit 504 stores the traffic-related information and the location information of each location of the road in association with each other.

The analysis unit 506 analyzes the traffic-related information of each location of the road in real time or later, and classifies the snow accumulation state, the road width state, and the slip state at each location of the road. The traffic-related information to be analyzed may be current traffic-related information received by the reception unit 502 or may be past traffic-related information stored in the storage unit 504.

(A) Classification of Snow Accumulation State

The analysis unit 506 analyzes the road image information included in the traffic-related information and classifies the snow accumulation state at each location of the road. As described above, the snow accumulation state includes, for example, the road surface state, the passable road width, or the like. The road surface state includes, for example, the presence or absence of snow on a road, the presence or absence of ruts on a snowy road, and the like. In the embodiment, an example will be described in which, for example, classifications such as "snow accumulation: no", "snow accumulation: yes, ruts: yes", and "snow accumulation: yes, ruts: no" are used as the classifications of the road surface state. However, the classifications are not limited to such an example, and as the classifications of the road surface state, the snow quality of accumulated snow and the type of ruts may be more finely classified into, for example, "new snow: yes", "frozen snow: yes", "ruts where the road surface is visible: yes", and "ruts where the road surface is invisible: yes".

The analysis unit 506 analyzes data of the road image included in the road image information, and analyzes and determines the road surface state such as the presence or absence of snow on the road or the presence or absence of ruts on the road, based on an analysis result of a luminance distribution of the road image or the like. As a method of determining such a road surface state, for example, a known image analysis technique can be used.

As the method of determining the presence or absence of snow among the road surface states, for example, a snowy road determination technique described in Japanese Unexamined Patent Application Publication No. 2005-084959 or the like can be used. By using such a known image analysis technique or the like, it is possible to compare the luminance distribution of a predetermined region of a captured road image with a luminance distribution pattern set in advance, and to determine the presence or absence of snow on the road based on the comparison result.

As a method of determining the presence or absence of a rut among the road surface states, for example, a rut detection technique described in Japanese Unexamined Patent Application Publication No. 2014-184747, Japanese Unexamined Patent Application Publication No. 2016-172500, or the like can be used. By using such a known image analysis technique or the like, the presence or absence of a rut on a road can be determined based on an image analysis result of a captured road image or a front area scanning result obtained by a radar device, an ultrasonic sensor, or the like.

As a method of determining a passable road width, for example, a road width detection technique described in Japanese Unexamined Patent Application Publication No. 2020-187593 can be used. By using such a known image analysis technique or the like, the road width of a snowy road can be determined by recognizing the left and right boundaries of a traveling lane of the snowy road, based on an analysis result of a captured road image, a detection result obtained by a periphery monitoring sensor, or the like.

(B) Classification of Road Width State

The analysis unit 506 analyzes the road image information to detect a passable road width W1 (hereinafter, referred to as a "snowy road width W1") in a state in which snow is present on the road. The analysis unit 506 further acquires a passable road width W2 (hereinafter, referred to as a "non-snowy road width W2") in a state in which no snow is present on the same road. For example, the analysis unit 506 may acquire the non-snowy road width W2 included in the location information received from each of the vehicles 1 on transmission side. Alternatively, the analysis unit 506 may acquire the non-snowy road width W2 of each road from map information used in a common navigation system. Alternatively, the analysis unit 506 may acquire the non-snowy road width W2 by analyzing the road image information acquired in the past when no snow is present.

Then, the analysis unit 506 compares the snowy road width W1 with the non-snowy road width W2, and classifies the road width state due to snow accumulation, based on the comparison result. For example, when a ratio (W1/W2) of the snowy road width W1 to the non-snowy road width W2 is equal to or less than a predetermined threshold (for example, equal to or less than 0.5), the analysis unit 506 determines that the road width state is "hindrance to passage: yes". On the other hand, if the ratio (W1/W2) is greater than the predetermined threshold, the analysis unit 506 determines that the road width state is "hindrance to passage: no". In the embodiment, for example, the road width state is classified in two levels but may be classified in three or more levels (for example, "hindrance to passage: yes", "hindrance to passage: slightly yes", and "hindrance to passage: no").

(C) Classification of Slip State

The analysis unit 506 analyzes the slip information, the tire information, and the drive system information included in the traffic-related information and classifies the slip state at each location of the road. The slip state is a classification indicating a state in which each of the vehicles 1 actually slipped on a snowy road. For example, the slip state may be classified depending on the presence or absence of a slip. Alternatively, the slip state may be classified based on not only the presence or absence of a slip but also the type of the tires 14, the drive system, or the like of one or more of the vehicles 1 that have slipped.

In the embodiment, an example will be described in which as classifications of the slip state, for example, a classification such as "normal tire" or "winter tire" is used in accordance with the type of the tires 14 of one or more of the vehicles 1 which are slipped and a classification such as "two-wheel drive (FR, FF)" or "four-wheel drive (4WD)" is used in accordance with the drive system of the wheels 13 of the one or more the vehicles 1 which are slipped.

Based on the traffic-related information and the location information of the road received from each of the vehicles 1, the class determination unit 508 determines, for the road on which each of the vehicles 1 has traveled, a difficulty class into which the travel difficulty caused by snow present on the road is classified. Specifically, the class determination unit 508 determines the difficulty class of each location of the road, based on the classification of the snow accumulation state or the classification of the slip state determined by the analysis unit 506. The class determination unit 508 generates difficulty information including the determined difficulty class and the like.

A specific example of a difficulty class determination process performed by the class determination unit 508 will now be described with reference to FIGS. 7 to 10. FIGS. 7 to 10 are explanatory diagrams illustrating specific examples of class determination tables for use in the difficulty class determination process according to the embodiment.

The class determination unit 508 determines, based on class determination criteria set in advance, the difficulty class of each location of the road, from (A) the classification of the snow accumulation state, (B) the classification of the road width, or (C) the classification of the slip state determined by the analysis unit 506. As the class determination criteria, for example, the class determination tables illustrated in FIGS. 7 to 10 can be used.

The storage unit 504 stores a plurality of kinds of class determination tables in advance. As illustrated in FIGS. 7 to 10, the class determination table is a table in which a criterion for determining a difficulty class is associated with identification information of the difficulty class. The criterion for determining a difficulty class is (A) the classification of the road surface state, (B) the classification of the road width state, or (C) the classification of the slip state described above. The identification information of a difficulty class is information for identifying the difficulty class set in a plurality of levels, and is, for example, any of class values such as "0" to "5".

(1) Determination of Class According to Snow Accumulation State

FIG. 7 illustrates a class determination table in the case where the classification of the road surface state is used as the criterion for determining the difficulty class. In the class determination table illustrated in FIG. 7, three classifications "snow accumulation: no", "snow accumulation: yes, ruts: yes", and "snow accumulation: yes, ruts: no" are set as the classifications of the road surface state. A difficulty class is set for each of these three road surface state classifications. For example, when the classification of the road surface state is "snow accumulation: no", a class value "0" indicating the lowest travel difficulty is set as the difficulty class. On the other hand, when the classification of the road surface state is "snow accumulation: yes, ruts: no", a class value "2" indicating a relatively high travel difficulty is set as the difficulty class.

The class determination unit 508 determines the difficulty class of the road in accordance with the road surface state of the road by using the class determination table illustrated in FIG. 7. Thus, as the road surface state of a road worsens, a difficulty class for a higher travel difficulty can be set for the road. For example, when snow is present on a road, the difficulty class of the road is set to a higher class than that set when no snow is present. In addition, when no ruts are formed on a snowy road, the difficulty class of the snowy road is set to a higher class than that set when ruts are formed. Thus, an appropriate difficulty class can be set in accordance with the road surface state such as the presence or absence of snow and ruts on the road. The difficulty class may be set in accordance with, for example, an amount of snow accumulation, a snow quality, a road surface frozen state, weather, an outdoor air temperature, or the like in addition to the road surface state.

(2) Determination of Class According to Road Width State

The class determination unit 508 may determine the difficulty class of a road in accordance with the road width narrowed by snow present on the road. As described above, when the road width (snowy road width W1) of a snowy road becomes narrower than the original road width (non-snowy road width W2) before snow accumulation because of snow accumulation and snow removal on the road, the travel difficulty of the snowy road increases. Accordingly, the class determination unit 508 determines the difficulty class so that the difficulty class becomes higher as the snowy road width W1 becomes narrower.

FIG. 8 illustrates a class determination table in the case where the classification of the road width state is used as the criterion for determining the difficulty class. In the class determination table illustrated in FIG. 8, two classifications "hindrance to passage: no" and "hindrance to passage: yes" are set as the classifications of the road width state. The difficulty class is set for each of these two classifications of the road width state. For example, when the classification of the road width state is "hindrance to passage: no", a class value "1" indicating a relatively low travel difficulty is set as the difficulty class. On the other hand, when the classification of the road width state is "hindrance to passage: yes", a class value "3" indicating a relatively high travel difficulty is set as the difficulty class.

The class determination unit 508 determines, by using the class determination table illustrated in FIG. 8, the difficulty class of a road in accordance with the classification of the road width state determined by the analysis unit 506. Thus, the class determination unit 508 can set an appropriate difficulty class in accordance with the road width state. As described above, the road width state is classified in two levels ("hindrance to passage: yes" and "hindrance to passage: no"), based on the result of comparison between the snowy road width W1 and the non-snowy road width W2. Thus, the class determination unit 508 can determine the difficulty class, based on the comparison result between the snowy road width W1 and the non-snowy road width W2.

(3) Determination of Class According to Slip State

FIG. 9 illustrates a class determination table in the case where the classification of the slip state is used as the criterion for determining the difficulty class. In the class determination table illustrated in FIG. 9, a total of six classifications are set as classifications of the slip state in accordance with the classifications of the type of the tires 14 and the classifications of the drive system of the wheels 13 of each of the vehicles 1 that has slipped. Specifically, two classifications "normal tire" and "winter tire" are set as the classifications of the type of the tires 14. Further, three classifications "FR", "FF", and "4WD" are set as the classifications of the drive system.

The difficulty class is set for each of these six classifications of the slip state. For example, when the type of the tires 14 is "normal tire" and the drive system is "FR" or "FF", a class value "1" indicating a relatively low travel difficulty is set as the difficulty class. On the other hand, when the type of the tires 14 is "winter tire" and the drive system is "4WD", a class value "4" indicating a relatively high travel difficulty is set as the difficulty class.

The class determination unit 508 determines, by using the class determination table illustrated in FIG. 9, the difficulty class of the road on which the slip has occurred in accordance with the slip state. Specifically, the class determination unit 508 determines the difficulty class of the road on which the slip has occurred, in accordance with the type of the tires 14 of each of the vehicles 1 that has slipped and the drive system of each of the vehicles 1 that has slipped. Thus, a high difficulty class is set for a road on which a slip has occurred even though one or more of the vehicles 1 which are slipped had snow tires and the drive systems resistant to snow. On the contrary, a low difficulty class is set for a road on which a slip has occurred because the one or more of the vehicles 1 which are slipped had non-snow tires and the drive systems weak to snow.

For example, when one or more of the vehicles 1 equipped with winter tires slip, a higher difficulty class is set than that set when the one or more of the vehicles 1 equipped with normal tires slip. In addition, when one or more of the vehicles 1 of the four-wheel drive system slip, a higher difficulty class is set than that set when the one or more of vehicles 1 of the two-wheel drive system slip. Thus, it is possible to set an appropriate difficulty class so that the difficulty class of a road on which a slip is more likely to occur becomes higher.

(4) Determination of Class According to Road Surface State and Slip State

FIG. 10 illustrates a class determination table in the case where classifications of the road surface state and the slip state are used as the criteria for determining the difficulty class. In the class determination table illustrated in FIG. 10, combined classifications of the above-described three classifications of the road surface state (see FIG. 7) and the above-described six classifications of the slip states (see FIG. 9) are set. The difficulty class is set for each of the three classifications of the road surface state and the six classifications of the slip state. For example, when the classification of the road surface state is "snow accumulation: no", a class value "0" indicating the lowest travel difficulty is set as the difficulty class. On the other hand, when the classification of the road surface state is "snow accumulation: yes, ruts: no", the type of the tires 14 is "winter tire", and the drive system is "4WD", a class value "5" indicating the highest travel difficulty is set as the difficulty class.

The class determination unit 508 determines, by using the class determination table illustrated in FIG. 10, the difficulty class of the road on which the slip has occurred in accordance with the road surface state and the slip state. Thus, it is possible to set an appropriate difficulty class so that the difficulty class becomes higher as the road surface state of the road becomes worse and that the difficulty class becomes higher as the road is more likely to cause a slip.

The specific examples of the difficulty class determination process performed by the class determination unit 508 has been described above. The class determination unit 508 stores the determined difficulty class of each location of the road in the storage unit 504 in association with the location information of the location of the road.

The transmission unit 510 transmits the difficulty information, including the difficulty class of each location on the road, and the location information which are stored in the storage unit 504, to the vehicles 1D and 1E on reception side in association with each other. The transmission unit 510 may transmit the difficulty class determined by the class determination unit 508 and the location information to the vehicles 1D and 1E on reception side in real time. Alternatively, the transmission unit 510 may regularly or irregularly transmit the difficulty class and the location information that are stored in the storage unit 504 to the vehicles 1D and 1E on reception side. The difficulty information transmitted to the vehicles 1D and 1E on reception side may include information on the road widths (for example, the snowy road width W1 and the non-snowy road width W2 described above) at the location indicated by the location information.

The functional configuration of the server apparatus 5 according to the embodiment has been described above. In the embodiment, the server apparatus 5 performs the difficulty class determination process but the configuration is not limited to such an example. For example, instead of the server apparatus 5, the vehicles 1A, 1B, and 1C on transmission side may perform the difficulty class determination process. That is, instead of the server apparatus 5, the vehicles 1A, 1B, and 1C on transmission side may include the analysis unit 506 and the class determination unit 508 illustrated in FIG. 6.

In this case, the analysis unit 506 of each of the vehicles 1A, 1B, and 1C may classify the above-described road surface state, road width state, slip state, and the like, based on the road image information, the slip information, the tire information, the drive system information, and the like collected by the vehicle. Furthermore, the class determination unit 508 of each of the vehicles 1A, 1B, and 1C may determine the difficulty class of the road on which the vehicle is traveling in accordance with the classifications of these states. Then, the transmission unit 208 of each of the vehicles 1A, 1B, and 1C may transmit the location information and the traffic-related information including the determined difficulty class to the server apparatus 5. As a result, the server apparatus 5 may collect the difficulty class included in the traffic-related information and the location information that are received from each of the vehicles 1A, 1B, and 1C on transmission side, and transmit the location information and the difficulty information including the difficulty class to each of the vehicles 1D and 1E on reception side. With such a configuration, it is possible to determine the difficulty class and distribute the difficulty class and the location information to each of the vehicles 1D and 1E on reception side, similarly to the server apparatus 5 described above.

[8. Functional Configurations of Vehicle on Reception Side and Navigation Apparatus]

Figure 11:
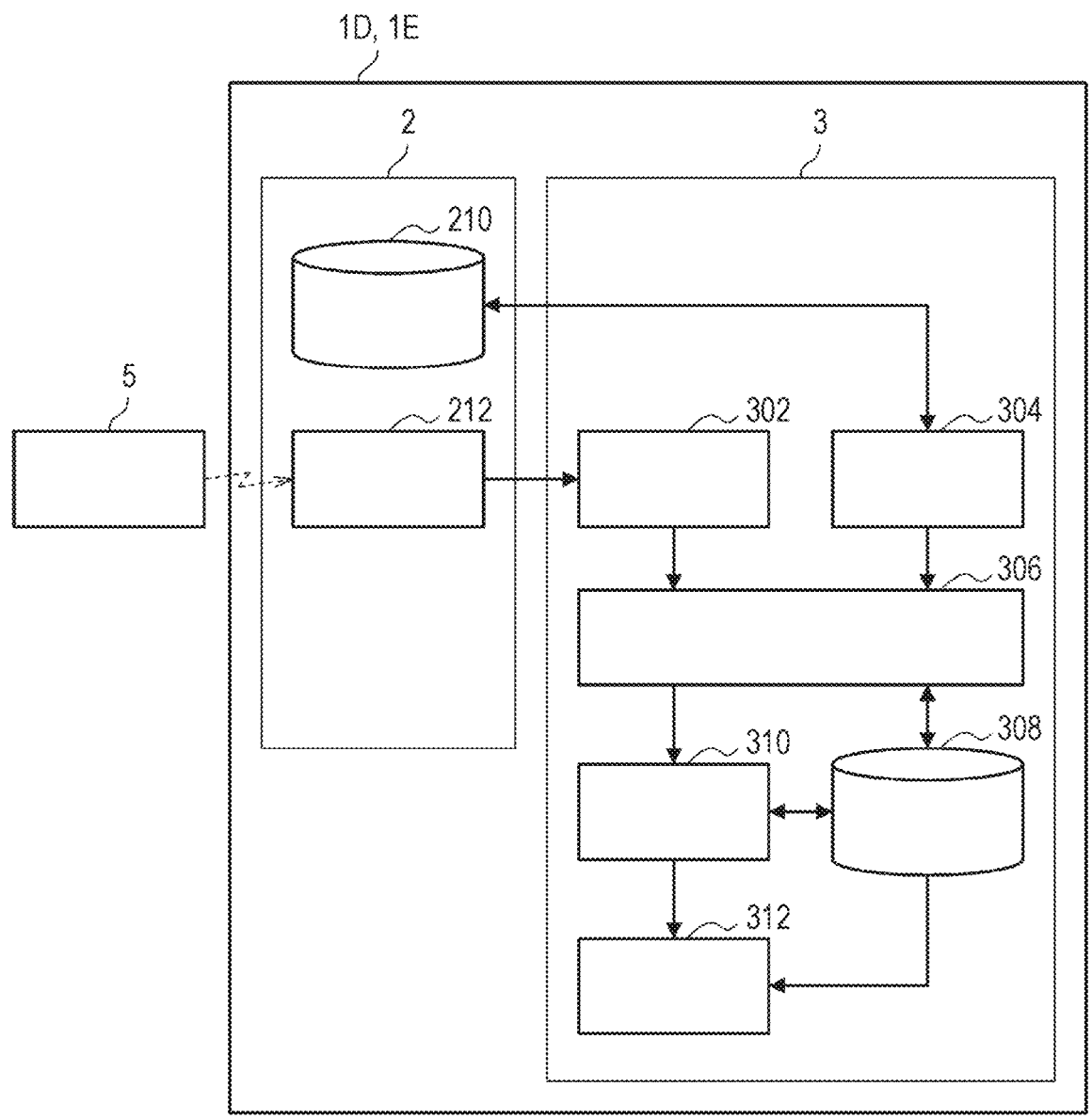
FIG. 11 is a block diagram illustrating an example of functional configurations of a vehicle on reception side and the navigation apparatus according to the embodiment.
Figure 12:
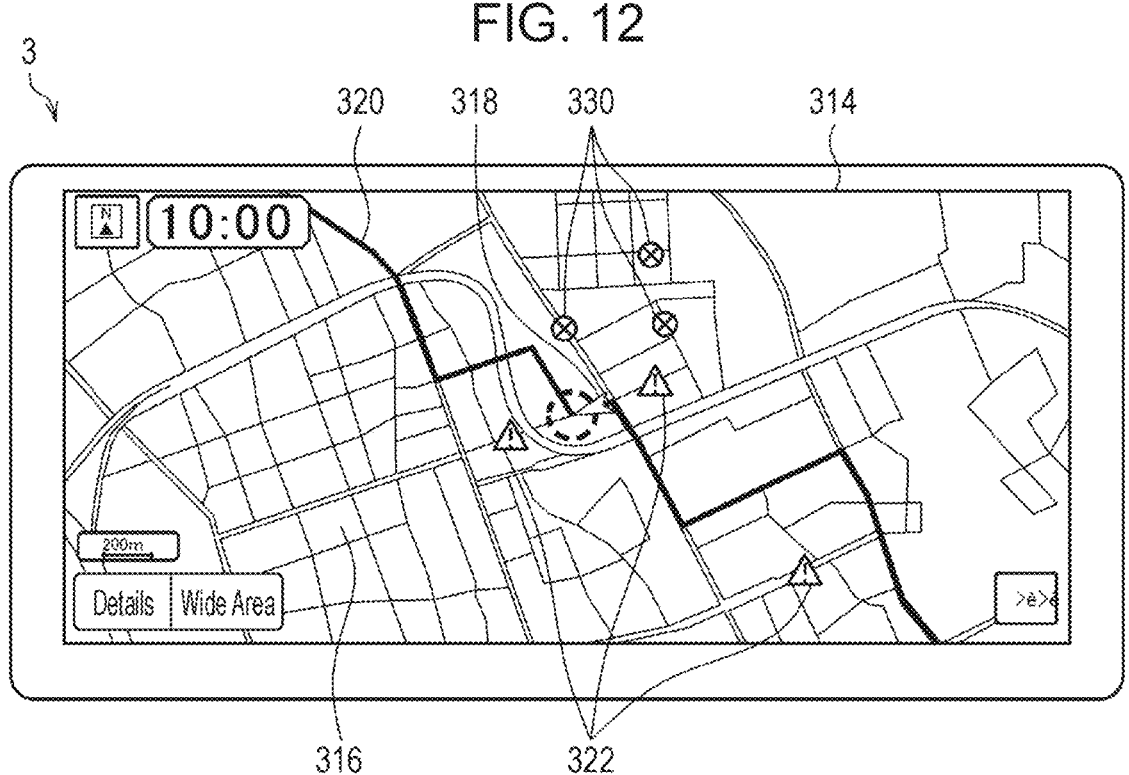
FIG. 12 is a schematic diagram illustrating an example of a display screen of the navigation apparatus according to the embodiment.
Figure 13:
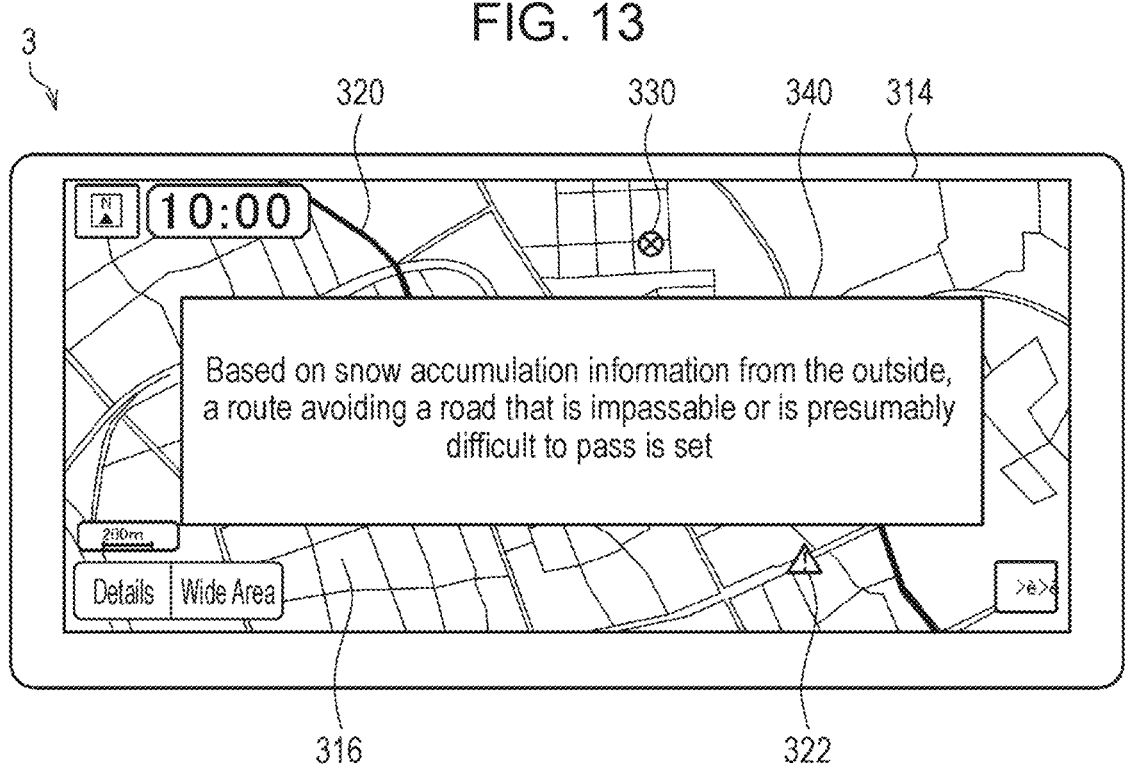
FIG. 13 is a schematic diagram illustrating as example of the display screen of the navigation apparatus according to the embodiment.

Next, with reference to FIGS. 11 to 13, functional configurations of the vehicles 1D and 1E on reception side (second vehicles) and the navigation apparatus 3 according to the embodiment will be described. FIG. 11 is a block diagram illustrating an example of the functional configurations of each of the vehicles 1 on reception side and the navigation apparatus 3 according to the embodiment. FIGS. 12 and 13 are schematic diagrams illustrating an example of a display screen of the navigation apparatus 3 according to the embodiment.

As illustrated in FIG. 11, each of the vehicles 1 on reception side includes a vehicle information storage unit 210, a reception unit 212, a difficulty class acquisition unit 302, a vehicle information acquisition unit 304, a traffic regulation setting unit 306, a storage unit 308, a route setting unit 310, and a display unit 312. Among these, the ECU 2 includes the vehicle information storage unit 210 and the reception unit 212. The navigation apparatus 3 includes the difficulty class acquisition unit 302, the vehicle information acquisition unit 304, the traffic regulation setting unit 306, the storage unit 308, the route setting unit 310, and the display unit 312. However, the configuration is not limited to such an example, and the navigation apparatus 3 may include one or both of the vehicle information storage unit 210 and the reception unit 212, for example.

The vehicle information storage unit 210 stores vehicle information related to driving performance of each of the vehicles 1 on reception side on a snowy road. The vehicle information includes, for example, information related to a vehicle width of each of the vehicles 1 on reception side, the type of the tires 14 mounted on each of the vehicles 1, and the drive system of the wheels 13 of each of the vehicles 1. The vehicle information may include other various kinds of information about each of the vehicles 1, for example, a vehicle model, a displacement, a manufacturing time of each of the vehicles 1, the number of years of use of the tires 14, and a degree of deterioration of the tires 14.

The reception unit 212 receives, from the server apparatus 5, the difficulty class of each road included in a road network around each of the vehicles 1 and the location information of the road. The reception unit 212 provides the received difficulty class and location information to the difficulty class acquisition unit 302. The reception unit 212 may also store the received difficulty class and location information in the storage unit 308.

The difficulty class acquisition unit 302 acquires the difficulty class of each road included in the road network around each of the vehicles 1 and the location information of the road. The difficulty class acquisition unit 302 may acquire the difficulty class and the location information from the reception unit 212 or the storage unit 308. The difficulty class acquisition unit 302 provides the difficulty class and the location information to the traffic regulation setting unit 306.

The vehicle information acquisition unit 304 acquires vehicle information related to driving performance of each of the vehicles 1 on a snowy road. The vehicle information acquisition unit 304 may acquire the vehicle information from the vehicle information storage unit 210 provided in the ECU 2. The vehicle information acquisition unit 304 provides the vehicle information to the traffic regulation setting unit 306.

Based on the difficulty class and the location information of each road included in the road network around each of the vehicles 1, the traffic regulation setting unit 306 sets a traffic regulation for passage of each of the vehicles 1 through the road. The traffic regulation setting unit 306 may set the traffic regulation, based further on the vehicle information indicating the driving performance of the vehicle on a snowy road in addition to the difficulty class and the location information. The traffic regulation setting unit 306 stores the set traffic regulation and the location information for the traffic regulation in the storage unit 308 in association with each other.

The storage unit 308 stores the traffic regulation and the location information of each road included in the road network around each of the vehicles 1 in association with each other. The storage unit 308 also stores the difficulty class and the location information of each road included in the road network around each of the vehicles 1 in association with each other. The storage unit 308 also stores various kinds of information such as map information, traffic jam information, and construction information used in the normal navigation function of the navigation apparatus 3.

The route setting unit 310 sets a travel route to a destination of each of the vehicles 1, based on the traffic regulation set by the traffic regulation setting unit 306, and guides each of the vehicles 1 to the destination along the set travel route. Further, the route setting unit 310 may set a travel route to a destination of each of the vehicles 1, based on the vehicle information indicating the driving performance of the vehicle on a snowy road in addition to the traffic regulation. The travel route set by the route setting unit 310 is displayed on the display unit 312.

The display unit 312 displays various images provided by the navigation apparatus 3. For example, as illustrated in FIGS. 12 and 13, the display unit 312 displays a map image 314 including the travel route set by the route setting unit 310. Details of the map image 314 displayed on the display unit 312 will be described later.

A specific example of a traffic regulation setting process performed by the traffic regulation setting unit 306 will now be described.

The traffic regulation setting unit 306 may set the traffic regulation, based on a generic difficulty class alone regardless of the driving performance unique to each of the vehicles 1 on a snowy road. The difficulty class distributed from the server apparatus 5 is information indicating the generic travel difficulty applicable to the plurality of vehicles 1. Such a generic difficulty class is set in a plurality of levels in accordance with the travel difficulty of each road caused by the snow accumulation state or the like. For example, the difficulty classes illustrated in FIGS. 7 to 10 are classified into six-level class values of "0" to "5".

Accordingly, the traffic regulation setting unit 306 can set a plurality of kinds of traffic regulations in stages in accordance with the class value of the difficulty class. For example, no traffic regulation may be set for a road for which the class value of the difficulty class is "0" or "1". In addition, a traffic regulation "caution for passage" may be set for a road for which the class value is "2" or "3". Further, a traffic regulation "passage prohibited" may be set for a road for which the class value is "4" or "5".

The traffic regulation "passage prohibited" is an example of a first traffic regulation that prohibits passage of each of the vehicles 1 through a road. The traffic regulation "caution for passage" is an example of a second traffic regulation that limits passage of each of the vehicles 1 through a road.

By setting the plurality of kinds of traffic regulations in stages in accordance with the class value of the generic difficulty class in this way, it is possible to set a traffic regulation suitable for the travel difficulty of each road.

The traffic regulation setting unit 306 may set the traffic regulation, based on the driving performance unique to each of the vehicles 1 on a snowy road in addition to the generic difficulty class described above. The driving performance of each of the vehicles 1 on a snowy road changes depending on the vehicle width, the type of tires, the drive system, and the like of each of the vehicles 1. Thus, even for the same snowy road, the travel difficulty of the snowy road changes depending on the driving performance of each of the vehicles 1 that travels on the snowy road.

Therefore, the traffic regulation setting unit 306 can set a plurality of kinds of traffic regulations in stages in accordance with not only the generic difficulty class but also the driving performance unique to each of the vehicles 1 (hereinafter, referred to as a "vehicle of interest" or "the vehicle") equipped with the navigation apparatus 3. For example, the traffic regulation "passage prohibited" may be set for a snowy road on which a vehicle of interest is likely to be unable to pass through in consideration of the difficulty class and the driving performance of the vehicle. In addition, the traffic regulation "caution for passage" may be set for a snowy road on which a vehicle of interest may pass through but with a difficulty.

Specifically, when a vehicle of interest is equipped with normal tires and the driving system of the vehicle of interest is FF, no traffic regulation may be set for a road for which the class value of the difficulty class is "1" or less, the traffic regulation "caution for passage" may be set for a road for which the class value is "2" or "3", and the traffic regulation "passage prohibited" may be set for a road for which the class value is "4" or "5". On the other hand, when a vehicle of interest is equipped with winter tires and the driving system of the vehicle of interest is 4WD, no traffic regulation may not be set for a road for which the class value of the difficulty class is "2" or less, the traffic regulation "caution for passage" may be set for a road for which the class value is "3" or "4", and the traffic regulation "passage prohibited" may be set just for a road for which the class value is "5".

By setting the plurality of kinds of traffic regulations in stages in accordance with a combination of the generic difficulty class and the driving performance unique to each of the vehicles 1 in this way, it is possible to set a more appropriate road regulation in consideration of the driving performance of the vehicle as well. For example, in the case where a vehicle of interest is a 4WD vehicle with winter tires, when an FF vehicle with winter tires has not slipped on a road on which an FF vehicle with normal tires has slipped, it is possible to determine that the road is passable and set no traffic regulation.

The traffic regulation setting unit 306 can also set the traffic regulation, based on the snowy road width W1 and a vehicle width W3 of the vehicle of interest. For example, in the case of "W1≥W3×1.4", no traffic regulation may be set. In the case of "W3×1.4>W1≥W3×1.2", the traffic regulation "caution for passage" may be set. In the case of "W1<W3×1.2", the traffic regulation "passage prohibited" may be set.

Further, as another example of restriction of passage based on the road width, regardless of the vehicle width W3 of the vehicle of interest, the traffic regulation "caution for passage" may be set when the above-described ratio (W1/W2) of the snowy road width W1 to the non-snowy road width W2 is equal to or less than a predetermined threshold (for example, equal to or less than 0.5). This case assumes, for example, a state in which a road having one lane on each side before snow accumulates has just the snowy road width W1 equivalent to one lane in both directions because of snow walls caused by snow accumulation and snow removal. When the road width becomes markedly narrow because of snow accumulation in this way, a traffic regulation is preferably set for the road.

Next, a specific example of a travel route setting process performed by the route setting unit 310 will be described.

The route setting unit 310 sets a travel route of one of the vehicles 1, based on the plurality of kinds of traffic regulations set in stages as described above, and guides the one of the vehicles 1 on the travel route to the destination. For example, the route setting unit 310 sets the travel route to the destination so that the vehicle does not pass through the road set to "passage prohibited". Consequently, the one of the vehicles 1 does not travel on a snowy road with a very high travel difficulty, and thus can safely travel to the destination without slipping or getting stuck.

The route setting unit 310 also sets the travel route to the destination to avoid the road set to "caution for passage" if possible. For example, the route setting unit 310 compares a distance of a detour route that does not include the road set to "caution for passage" with a distance of a short-distance route that includes the road set to "caution for passage". If the difference between the distances is less than a predetermined distance as a result of the comparison, the route setting unit 310 sets the travel route to the detour route. On the other hand, if the difference between the distances is equal to or greater than the predetermined distance, the route setting unit 310 sets the travel route to the short-distance route. Thus, it is possible to avoid passing through a snowy road with a relatively high travel difficulty while avoiding traveling along an excessively long detour route to the destination.

The travel route set by the route setting unit 310 in the above manner is displayed on the display unit 312 of the navigation apparatus 3. The map image 314 and a travel route 320 displayed on the display unit 312 will be described below with reference to FIGS. 12 and 13.

As illustrated in FIG. 12, the display unit 312 of the navigation apparatus 3 displays the map image 314 for guiding the one of the vehicles 1 on the traveling route 320. In the map image 314, a map 316 representing a road network around the one of the vehicles 1 and a mark 318 representing a current location and a traveling direction of the one of the vehicles 1 are displayed. The travel route 320 set by the route setting unit 310 is also displayed in the map image 314. The travel route 320 is a travel route to the destination, which is set in accordance with the snow accumulation state at each location in the road network around the vehicle of interest, the driving performance of the vehicle of interest, and the like. With the travel route 320, the navigation apparatus 3 can guide the vehicle on the appropriate travel route 320 determined in consideration of the snow accumulation state, the driving performance, and the like.

In the map image 314, marks 330 and 332 indicating traffic regulations are further displayed to be superimposed on one or two or more roads for which the traffic regulations are set by the traffic regulation setting unit 306. The marks 330 represent the traffic regulation "passage prohibited". The marks 332 represent the traffic regulation "caution for passage". By displaying the marks 330 and 332 indicating such traffic regulations, the driver can confirm, in the map image 314, the locations of the roads for which the traffic regulations "passage prohibited" and "caution for passage" are set because of snow accumulation.

Further, the travel route 320 for guiding the vehicle of interest to the destination is set to avoid a plurality of roads (roads on which the marks 330 and 332 are displayed to be superimposed) for which the traffic regulations "passage prohibited" and "caution for passage" are set because of the snow accumulation state or the like. Thus, by driving the one of the vehicles 1 along the guided travel route, the driver can reach the destination without passing through the roads for which the traffic regulations "passage prohibited" and "caution for passage" are set.

In addition, when the vehicle is guided on the travel route 320 to avoid these roads for which the traffic regulations are set, a notification 340 indicating that the travel route 320 has been set to avoid the traffic regulations due to the snow accumulation state and the like may be displayed to be superimposed on the map image 314 as illustrated in FIG. 13. Thus, even if the guided travel route 320 includes a detour of some extent or has a route setting or the like that is different from a route setting for the normal time without snow, the driver can recognize the reason and thus can feel safe with or trust the navigation apparatus 3.

As described above, when the detour route becomes excessively long, there is a case where the short-distance route is set which involves passage through a snowy road for which the traffic regulation "caution for passage" is set, and the short-distance route is suggested as the travel route to the destination. In this case, when the vehicle passes through the snowy road for which the traffic regulation "caution for passage" is set, the navigation apparatus 3 may output a message or sound for calling the driver's attention to passage. Thus, the driver can drive with caution when traveling on the snowy road, so that the occurrence of slipping, getting stuck, and accidents caused by snow accumulation can be suppressed.

[9. Processing Flow of Navigation System]

Figure 14:
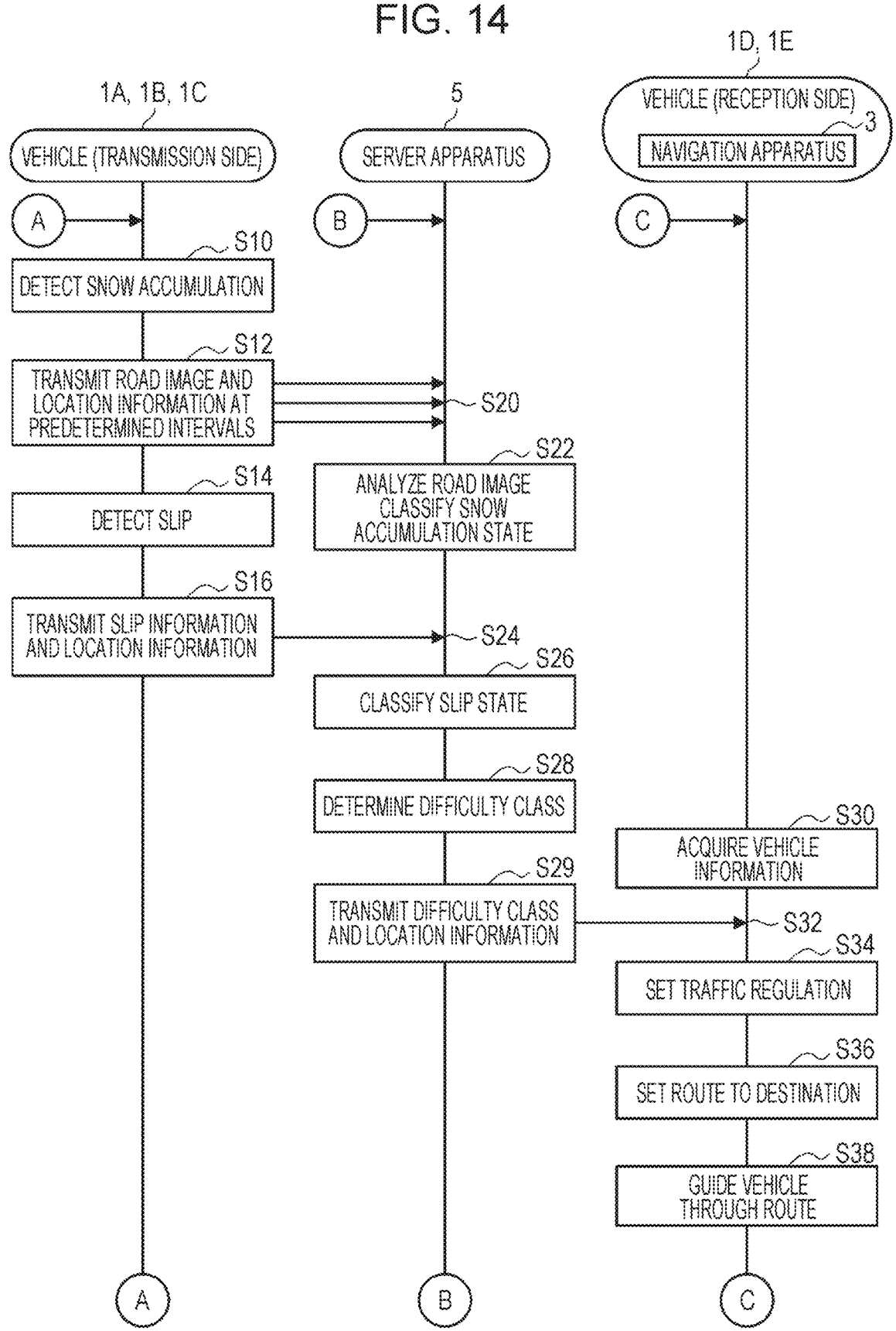
FIG. 14 is a sequence diagram illustrating a process performed by the navigation system according to the embodiment.

Next, a process performed by the navigation system 100 according to the embodiment will be described with reference to FIG. 14. FIG. 14 is a sequence diagram illustrating the process performed by the navigation system 100 according to the embodiment.

As illustrated in FIG. 14, each of the vehicles 1A, 1B, and 1C on transmission side (hereinafter, referred to as "vehicles 1 on transmission side) detects snow present on a road on which the vehicle is traveling (S10). For example, the vehicles 1 on transmission side detects the presence or absence of snow on the road on which the vehicle is traveling, from a luminance distribution of a road image captured by the camera 15 mounted on the vehicle. At or after the detection of snow, the vehicles 1 on transmission side transmits the road image information on the snowy road and the location information of the location of the snowy road to the server apparatus 5 at predetermined intervals (S12). When detecting that snow is no longer present on the road, the vehicles 1 on transmission side may stop transmitting the road image information and the location information.

The server apparatus 5 receives the road image information and the location information of the snowy road at each location of the road network from the plurality of vehicles 1 on transmission side any time (S20), collects and stores these pieces of information. Then, the server apparatus 5 analyzes the received road image information and the like, and classifies the snow accumulation state (for example, the road surface state or the road width state) of the snowy road at each location of the road network (S22).

If one or more of the vehicles 1 on transmission side slip while traveling on the snowy road, the one or more of the vehicles 1 on transmission side detect the occurrence of the slip (S14). The occurrence of slip can be detected from the wheel rotation speeds and the vehicle speed of each of the vehicles. Upon detecting the occurrence of a slip, the one or more of the vehicles 1 on transmission side transmit, to the server apparatus 5, the location information indicating the location of the snowy road on which the slip has occurred, the slip information indicating the occurrence of the slip, and the tire information and the drive system information of each of the vehicles (S16). As described above, when a slip occurs, the one or more of the vehicles 1 on transmission side transmit slip information and the like and the location information to the server apparatus 5 simultaneously.

The server apparatus 5 receives the slip information related to the snowy road at each location of the road network, the tire information, the drive system information, and the location information from the plurality of vehicles 1 on transmission side (S24), and collects and stores these pieces of information. Then, the server apparatus 5 analyzes the received slip information, tire information, drive system information, and the like, and classifies the slip state of the snowy road at each location of the road network (S26).

Next, the server apparatus 5 determines the difficulty class of the snowy road at each location of the road network, based on the snow accumulation state classified in S22 and the slip state classified in S26 (S28). The server apparatus 5 determines the difficulty class for each snowy road by using, for example, the class determination tables illustrated in FIGS. 7 to 10. The server apparatus 5 preferably determines the difficulty class, based on both the snow accumulation state and the slip state but may determine the difficulty class, based on either one of the snow accumulation state and the slip state. In addition, the difficulty class may be determined by using in combination the pieces of traffic-related information received from the plurality of different vehicles 1 that have traveled at close road locations at close times.

The server apparatus 5 regularly or irregularly transmits the difficulty class of the snowy road at each location of the road network determined in the S28 and the location information of the snowy road to the plurality of vehicles 1D and 1E on reception side (S29).

Each of the vehicles 1D and 1E on reception side (hereinafter, referred to as "vehicles 1 on reception side") receives the difficulty class and the location information of the snowy road at each location of the road network from the server apparatus 5 (S32). The navigation apparatus 3 provided in each of the vehicles 1 on reception side receives, collects, and stores these difficulty class and location information. In addition, the navigation apparatus 3 of each of the vehicles 1 on reception side acquires in advance the vehicle information such as the vehicle width, the tire type, and the drive system of each of the vehicles 1 on reception side (vehicles of interest) (S30).

Then, the navigation apparatus 3 of each of the vehicles 1 on reception side sets a traffic regulation suitable for the vehicle, based on the difficulty class received from the server apparatus 5 and the vehicle information of the vehicle (S34). Next, the navigation apparatus 3 sets a travel route to the destination, based on the set traffic regulation (S36). Then, the navigation apparatus 3 displays the travel route 320 (see FIG. 12) to the destination in the map image 314 on the display screen of the navigation function as illustrated in FIG. 12, and guides the vehicle (S38).

Then, each of the vehicles 1 on transmission side repeatedly performs the processing of S10 to S16 described above. The server apparatus 5 repeatedly performs the processing of S20 to S29 described above. The navigation apparatus 3 of each of the vehicles 1 on reception side repeatedly performs the processing of S30 to S38 described above.

The processes performed by the vehicles 1, the server apparatus 5, and the navigation apparatus 3 of the navigation system 100 according to the embodiment have been described above with reference to FIG. 14. The processes are implemented by installing programs for performing the respective processes in the vehicles 1, the server apparatus 5, and the navigation apparatus 3, for example.

[10. Supplementary Note]

As described above, the embodiment provides a navigation system (100) including a server apparatus (5) to be connected to a plurality of vehicles (1) via a network (7) to be able to communicate with the plurality of vehicles (1), and a navigation apparatus (3) to be connected to the server apparatus (5) via the network to be able to communicate with the server apparatus (5), in which the server apparatus (5) is configured to receive, from at least one first vehicle (1A, 1B, 1C) among the plurality of vehicles (1), traffic-related information related to at least one of snow present on a road on which the first vehicle (1A, 1B, 1C) has traveled or slipperiness of the road, and location information of the road, generate, based on the traffic-related information and the location information, difficulty information for the road on which the first vehicle (1A, 1B, 1C) has traveled, the difficulty information being information related to a travel difficulty caused by the at least one of the snow present on the road or the slipperiness of the road, and transmit the difficulty information and the location information of the road on which the first vehicle (1A, 1B, 1C) has traveled, to the navigation apparatus (3) installed to be movable together with a second vehicle (1D, 1E) that is identical to or different from the first vehicle (1A, 1B, 1C) among the plurality of vehicles, and the navigation apparatus (3) is configured to receive the difficulty information and the location information from the server apparatus (5), set a traffic regulation for passage of the second vehicle (1D, 1E) through the road, based on the difficulty information and the location information, and set a travel route to a destination of the second vehicle (1D, 1E), based on the traffic regulation.

Thus, the difficulty information indicating the travel difficulty of the road for the plurality of vehicles (1) is set in accordance with the actual state of snow on the road on which each of the first vehicles (1A, 1B, 1C) has traveled or the actual state of slipperiness of the road. The traffic regulation is then set for the road at each location of the road network in accordance with the difficulty information. A travel route of each of the second vehicles (1D, 1E) is set in accordance with the traffic regulation, and the second vehicle is guided to the destination along the travel route. Thus, it is possible to guide each of the second vehicles (1D, 1E) on an appropriate travel route to a destination in accordance with the travel difficulty that is based on the actual state of snow or the actual state of slipperiness on the road on which each of the first vehicles (1A, 1B, and 1C) has traveled.

The traffic-related information may include at least one of road image information obtained by imaging the road on which the first vehicle (1A, 1B, 1C) has traveled, slip information indicating presence or absence of a slip of the first vehicle (1A, 1B, 1C) during traveling on the road, tire information indicating a type of a tire (14) mounted on the first vehicle (1A, 1B, 1C), or drive system information indicating a drive system of a wheel (13) of the first vehicle (1A, 1B, 1C).

Thus, the road surface state, the road width state, or the like of a snowy road can be classified based on the road image information. Further, the slip state of a snowy road on which a slip has occurred can be classified based on the slip information, the tire information, the drive system information, or the like. Therefore, the difficulty class can be appropriately determined in accordance with the road surface state, the road width state, the slip state, or the like of the snowy road.

The difficulty information may include a difficulty class, into which the travel difficulty, caused by the snow present on the road, of the road on which the first vehicle (1A, 1B, 1C) has traveled is classified.

Thus, in accordance with the actual snow accumulation state of the road on which each of the first vehicles (1A, 1B, and 1C) has traveled, the difficulty class indicating the travel difficulty of the road for the plurality of vehicles (1) is set. The traffic regulation of the road at each location of the road network is then set in accordance with the difficulty class. A travel route of each of the second vehicles (1D, 1E) is set in accordance with the traffic regulation, and the second vehicle is guided through the travel route to the destination. Thus, it is possible to guide each of the second vehicles (1D, 1E) on an appropriate travel route to a destination in accordance with the travel difficulty that is based on the actual snow accumulation state of the road on which each of the first vehicles (1A, 1B, and 1C) has traveled.

The traffic-related information may include road image information obtained by imaging the road on which the first vehicle (1A, 1B, 1C) has traveled, and the server apparatus (5) may be configured to
classify, based on the road image information, a road surface state of the road including at least one of presence or absence of snow on the road, or presence or absence of a rut on the road, and
determine the difficulty class of the road on which the first vehicle (1A, 1B, 1C) has traveled, in accordance with a classification of the road surface state.

Thus, the road surface state including at least one of the presence or absence of snow on the road or the presence or absence of a rut on the road can be appropriately classified, based on the road image information obtained when the first vehicle (1A, 1B, and 1C) travels. Therefore, it is possible to appropriately determine the difficulty class in accordance with the road surface state of the snowy road and to guide the vehicle on an appropriate travel route.

The traffic-related information may include slip information indicating presence or absence of a slip of the first vehicle (1A, 1B, 1C) during traveling on the road, and
the server apparatus (5) may be configured to
classify a slip state of the road, based on the slip information, and
determine the difficulty class of the road on which the slip has occurred, in accordance with a classification of the slip state.

Thus, it is possible to appropriately classify the slip state of the snowy road on which the slip has occurred, based on the slip information of the first vehicle (1A, 1B, 1C) that has slipped. Therefore, it is possible to appropriately determine the difficulty class of the road on which the slip has occurred in accordance with the slip state and to guide the vehicle on an appropriate travel route.

The traffic-related information may further include
tire information indicating a type of a tire (14) mounted on the first vehicle (1A, 1B, 1C),
the server apparatus (5) may be configured to
classify, based on the slip information and the tire information, the type of the tire mounted on the first vehicle (1A, 1B, 1C) that has slipped, and determine the difficulty class of the road on which the slip has occurred in accordance with a classification of the type of the tire.

Thus, it is possible to appropriately classify the slip state of the snowy road on which the slip has occurred, based on the slip information and the tire information of the first vehicle (1A, 1B, 1C) that has slipped. Therefore, it is possible to appropriately determine the difficulty class of the road on which the slip has occurred in accordance with the slip state that takes into account the type of the tires (14) of the first vehicle (1A, 1B, 1C) that has slipped, and to guide the vehicle on an appropriate travel route.

The traffic-related information may further include
drive system information indicating a drive system of a wheel (13) of the first vehicle (1A, 1B, 1C), and
the server apparatus (5) may be configured to
classify, based on the slip information and the drive system information, the drive system of the first vehicle (1A, 1B, 1C) that has slipped, and determine the difficulty class of the road on which the slip has occurred in accordance with a classification of the drive system.

Thus, it is possible to appropriately classify the slip state of the snowy road on which the slip has occurred, based on the slip information and the drive system information of the first vehicle (1A, 1B, 1C) that has slipped. Therefore, it is possible to appropriately determine the difficulty class of the road on which the slip has occurred, in accordance with the slip state that takes into account the drive system of the wheel (13) of the first vehicle (1A, 1B, 1C) that has slipped, and to guide the vehicle on an appropriate travel route.

The traffic-related information may include road image information obtained by imaging the road on which the first vehicle (1A, 1B, 1C) has traveled, and
the server apparatus (5) may be configured to
detect, based on the road image information, a road width (W1) in a state where the snow is present on the road, and determine the difficulty class of the road on which the first vehicle (1A, 1B, 1C) has traveled, based on a result of comparison between the road width (W1) in the state where the snow is present on the road and a road width (W2) in a state where no snow is present on the road.

Thus, the road width state of the snowy road can be appropriately classified by comparing the actual road width (W1) of the snowy road and the road width (W2) of the road without snow, based on the road image information obtained during traveling of the first vehicles (1A, 1B, 1C). Therefore, it is possible to appropriately determine the difficulty class in accordance with the road width state of the snowy road and to guide the vehicle on an appropriate travel route.

The navigation apparatus (3) may be configured to
set, as the traffic regulation, a first traffic regulation that prohibits passage of the second vehicle (1D, 1E) through the road, and
set the travel route such that the second vehicle does not pass through the road for which the first traffic regulation is set.

Thus, when the travel difficulty of the snowy road is very high, the first traffic regulation can be set for the snowy road, and each of the second vehicles (1D, 1E) can be guided on the travel route by excluding the snowy road from the travel route. Therefore, each of the second vehicles (1D, 1E) can safely and reliably travel along the guided travel route to reach the destination without passing through the snowy road.

The navigation apparatus (3) may be configured to
set, as the traffic regulation, a second traffic regulation that limits passage of the second vehicle (1D, 1E) through the road, and
set the travel route such that the road for which the second traffic regulation is set is avoided.

Thus, the travel route of the second vehicle (1D, 1E) is set so that the second vehicle (1D, 1E) avoids the snowy road for which the second traffic regulation is set, in accordance with the second traffic regulation that limits passage through the snowy road. Therefore, when the travel difficulty of the snowy road is relatively high, it is possible to more appropriately guide each of the second vehicles (1D, 1E) on the travel route to the destination.

Thus, when the travel difficulty of the snowy road is relatively high, by setting the second traffic regulation for the snowy road, each of the second vehicles (1D, 1E) can be guided on a travel route so that the second vehicle does not pass through the snowy road if possible. Therefore, each of the second vehicles (1D, 1E) can safely and reliably travel along the guided travel route to reach the destination without passing through the snowy road if possible.

The navigation apparatus (3) may be configured to
acquire vehicle information related to driving performance of the second vehicle (1D, 1E) on a snowy road, and
set the traffic regulation, based on the difficulty class, the location information, and the vehicle information.

Thus, it is possible to more appropriately set the traffic regulation for each of the second vehicles (1D, 1E) in consideration of not only the generic difficulty class for the plurality of vehicles (1) but also the driving performance unique to the second vehicle (1D, 1E).

The vehicle information may include at least one of a type of a tire (14) mounted on the second vehicle (1D, 1E) or a drive system of a wheel (13) of the second vehicle (1D, 1E), and the navigation apparatus (3) may be configured to set the traffic regulation according to the driving performance of the second vehicle (1D, 1E) on the snowy road, based on the difficulty class, the location information, and the vehicle information.

Thus, it is possible to more appropriately set the traffic regulation for each of the second vehicles (1D, 1E) in accordance with not only the generic difficulty class for the plurality of vehicles (1) but also the driving performance on the snowy road based on a factor such as the type of the tires (14) or the drive system of the wheels (13) unique to the second vehicle (1D, 1E).

The traffic-related information may include road image information obtained by imaging the road on which the first vehicle (1A, 1B, 1C) has traveled, the server apparatus (5) may be configured to detect, based on the road image information, a road width (W1) in a state in which the snow is present on the road,
the difficulty information may include the road width (W1) in the state in which the snow is present on the road, and
the navigation apparatus (3) may be configured to
acquire a vehicle width (W3) of the second vehicle (1D, 1E), and
set the traffic regulation, based on the road width (W1) in the state in which the snow is present on the road and the vehicle width (W3) of the second vehicle.

Thus, it is possible to detect the actual road width (W1) of the snowy road based on the road image information obtained during traveling of the first vehicle (1A, 1B, 1C), and appropriately set the traffic regulation based on the result of comparison between the road width (W1) and the vehicle width (W3) of the second vehicle (1D, 1E). Therefore, it is possible to guide the second vehicle (1D, 1E) having the vehicle width (W3) on an appropriate travel route by appropriately setting the traffic regulation in accordance with whether the second vehicle can pass through the snowy road having the road width (W1).

The navigation apparatus (3) may be configured to display a mark indicating the traffic regulation over the road for which the traffic regulation is set in a map image indicating the travel route.

Thus, the driver can easily recognize visually, in the map image, the location of the road for which the traffic regulation is set because of snow.

The traffic-related information may include a difficulty class, into which the travel difficulty, caused by the snow present on the road, of the road on which the first vehicle has traveled is classified, and the server apparatus may be configured to
generate the difficulty information including the difficulty class, and
transmit the location information and the difficulty information including the difficulty class to the navigation apparatus.

Thus, instead of the server apparatus (5), each of the first vehicles (1A, 1B, 1C) can perform the difficulty class determination process in a distributed manner, so that the processing load of the server apparatus 5 can be reduced.

The traffic-related information may include a road width, of the road on which the first vehicle has traveled, in a state where the snow is present on the road, and the server apparatus may be configured to
generate the difficulty information including the road width, and
transmit the location information and the difficulty information including the road width to the navigation apparatus.

Thus, instead of the server apparatus (5), each of the first vehicles (1A, 1B, 1C) can perform the road width calculation process in a distributed manner, so that the processing load of the server apparatus 5 can be reduced.

While the embodiment of the invention has been described with reference to the accompanying drawings, it is needless to say that the invention is not limited to such an embodiment. It is obvious that those skilled in the art can conceive various alterations and modifications within the scope described in the claims, and it is understood that those alterations and modifications naturally belong to the technical scope of the invention.

Note that a series of processes performed by each apparatus (for example, the vehicles 1, the navigation apparatus 3, or the server apparatus 5) according to the embodiment described above may be implemented by using any of software, hardware, or a combination of software and hardware. A program constituting the software is stored in advance in, for example, a non-transitory storage medium (non-transitory media) provided inside or outside each apparatus. Then, the program is read from the non-transitory storage medium (for example, a ROM) to a transitory storage medium (for example, a RAM) and executed by a processor such as a CPU, for example.

It is possible to create a program for implementing each function of each apparatus described above and install the program on a computer of each apparatus described above. The processor executes the program stored in the memory, whereby the process of each function described above is performed. At this time, the program may be executed by a plurality of processors in a distributed manner, or may be executed by one processor. Further, the function of each apparatus may be implemented by cloud computing using a plurality of computers connected to each other via a communication network.

The program may be distributed from an external apparatus via the communication network to be provided to and installed on a computer of each apparatus. Alternatively, the program may be stored in a non-transitory computer-readable recording medium (non-transitory computer readable medium), and may be provided to and installed on a computer of each apparatus via the recording medium.

Further, according to the embodiment, a program for performing the process of each function of each apparatus described above can be provided. Furthermore, a non-transitory computer-readable recording medium storing the program may be provided. The non-transitory recording medium may be, for example, a disk recording medium such as an optical disk, a magnetic disk, or a magneto-optical disk, or may be a semiconductor memory such as a flash memory or a USB memory.

The invention claimed is:

1. A navigation system comprising:
a server apparatus configured to communicate with vehicles via a network; and a navigation apparatus configured to communicate with the server apparatus via the network, wherein the server apparatus is configured to receive, from at least one first vehicle among the vehicles, (1) traffic-related information related to at least one of snow present on a road on which the first vehicle has traveled or slipperiness of the road, and (2) location information of the road, generate, based on the traffic-related information and the location information, difficulty information for the road on which the first vehicle has traveled, the difficulty information being information related to a travel difficulty caused by the at least one of the snow present on the road or the slipperiness of the road, and transmit the difficulty information and the location information of the road on which the first vehicle has traveled, to the navigation apparatus installed to be movable together with a second vehicle among the vehicles, the second vehicle being identical to or different from the first vehicle, the navigation apparatus is configured to receive the difficulty information and the location information from the server apparatus, set a traffic regulation for passage of the second vehicle through the road, based on the difficulty information and the location information, and set a travel route of the second vehicle to a destination of the second vehicle, based on the traffic regulation, the difficulty information comprises a difficulty class, into which the travel difficulty of the road on which the first vehicle has traveled is classified, the travel difficulty being caused by the snow present on the road, the traffic-related information comprises road image information obtained by imaging the road on which the first vehicle has traveled, and the server apparatus is configured to obtain, from the road image information, a luminance distribution of a predetermined region of a captured road image, analyze, using an image analysis technique, the luminance distribution by comparing the luminance distribution with a luminance distribution pattern set, detect, based on analysis of the road image information, a first road width that is a passable road width in a state where the snow is present on the road, and determine the difficulty class of the road on which the first vehicle has traveled, based on a result of comparison between the first road width and a second road width that is a road width in a state where the snow is not present on the road.

2. The navigation system according to claim 1, wherein the traffic-related information comprises at least one of slip information indicating whether a slip occurs to the first vehicle during traveling on the road, tire information indicating a type of a tire mounted on the first vehicle, or drive system information indicating a drive system of a wheel of the first vehicle.

3. The navigation system according to claim 1, wherein the server apparatus is configured to execute a classification of a road surface state of the road based on the road image information, the road surface state comprising at least one of: presence or absence of the snow on the road; or presence or absence of a rut on the road, and determine the difficulty class of the road on which the first vehicle has traveled, in accordance with the classification of the road surface state.

4. The navigation system according to claim 1, wherein the traffic-related information comprises slip information indicating presence or absence of a slip of the first vehicle during traveling on the road, and the server apparatus is configured to execute a classification of a slip state of the road, based on the slip information, and determine the difficulty class of the road on which the slip has occurred, in accordance with the classification of the slip state.

5. The navigation system according to claim 4, wherein the traffic-related information comprises tire information indicating a type of a tire mounted on the first vehicle, and the server apparatus is configured to execute, based on the slip information and the tire information, a classification of the type of the tire mounted on the first vehicle that has slipped, and determine the difficulty class of the road on which the slip has occurred in accordance with the classification of the type of the tire.

6. The navigation system according to claim 4, wherein the traffic-related information comprises drive system information indicating a drive system of a wheel of the first vehicle, and the server apparatus is configured to execute, based on the slip information and the drive system information, a classification of the drive system of the first vehicle that has slipped, and determine the difficulty class of the road on which the slip has occurred in accordance with the classification of the drive system.

7. The navigation system according to claim 1, wherein the navigation apparatus is configured to set, as the traffic regulation, a first traffic regulation that prohibits passage of the second vehicle through the road, and set the travel route such that the second vehicle does not pass through the road for which the first traffic regulation is set.

8. The navigation system according to claim 1, wherein the navigation apparatus is configured to set, as the traffic regulation, a second traffic regulation that limits passage of the second vehicle through the road, and set the travel route such that the road for which the second traffic regulation is set is avoided.

9. The navigation system according to claim 1, wherein the navigation apparatus is configured to acquire vehicle information related to driving performance of the second vehicle on a snowy road, and set the traffic regulation, based on the difficulty class, the location information, and the vehicle information.

10. The navigation system according to claim 9, wherein the vehicle information comprises at least one of a type of a tire mounted on the second vehicle or a drive system of a wheel of the second vehicle, and the navigation apparatus is configured to set the traffic regulation according to the driving performance of the second vehicle on the snowy road, based on the difficulty class, the location information, and the vehicle information.

11. The navigation system according to claim 1, wherein
the difficulty information comprises the first road width, and
the navigation apparatus is configured to
acquire a vehicle width of the second vehicle, and
set the traffic regulation, based on the first road width and the vehicle width of the second vehicle.

12. The navigation system according to claim 1, wherein the navigation apparatus is configured to display, in a map image indicating the travel route, a mark indicating the traffic regulation over the road for which the traffic regulation is set.

13. The navigation system according to claim 1, wherein
the traffic-related information comprises the difficulty class into which the travel difficulty of the road on which the first vehicle has traveled is classified, the travel difficulty being caused by the snow present on the road, and
the server apparatus is configured to
generate the difficulty information comprising the difficulty class, and
transmit the location information and the difficulty information comprising the difficulty class to the navigation apparatus.

14. A server apparatus vehicles via a network to be able to communicate with the vehicles, the server apparatus comprising:
one or more processors; and
one or more memories coupled to the one or more processors, wherein
the one or more processors are configured to perform a process comprising:
receiving, from at least one first vehicle among the vehicles, (1) traffic-related information related to at least one of snow present on a road on which the first vehicle has traveled or slipperiness of the road, and (2) location information of the road;
generating, based on the traffic-related information and the location information, difficulty information for the road on which the first vehicle has traveled, the difficulty information being information related to a travel difficulty caused by the at least one of the snow present on the road or the slipperiness of the road; and
transmitting the difficulty information and the location information of the road on which the first vehicle has traveled, to a navigation apparatus installed to be movable together with a second vehicle among the vehicles, the second vehicle being identical to or different from the first vehicle,
the difficulty information comprises a difficulty class, into which the travel difficulty of the road on which the first vehicle has traveled is classified, the travel difficulty being caused by the snow present on the road,
the traffic-related information comprises road image information obtained by imaging the road on which the first vehicle has traveled, and
the processors are configured to
obtain, from the road image information, a luminance distribution of a predetermined region of a captured road image,
analyze, using an image analysis technique, the luminance distribution by comparing the luminance distribution with a luminance distribution pattern set,
detect, based on analysis of the road image information, a first road width that is a passable road width in a state where the snow is present on the road, and
determine the difficulty class of the road on which the first vehicle has traveled, based on a result of comparison between first road width and a second road width that is a road width in a state where the snow is not present on the road.

* * * * *